(12) United States Patent
Hattori

(10) Patent No.: US 7,621,195 B2
(45) Date of Patent: Nov. 24, 2009

(54) VEHICLE TRANSMISSION

(75) Inventor: Noboru Hattori, Yokosuka (JP)

(73) Assignee: Jatco Ltd, Fuji-shi (JP)

( * ) Notice: Subject to any disclaimer, the term of this patent is extended or adjusted under 35 U.S.C. 154(b) by 373 days.

(21) Appl. No.: 11/702,061

(22) Filed: Feb. 5, 2007

(65) Prior Publication Data

US 2007/0199393 A1 Aug. 30, 2007

(30) Foreign Application Priority Data

Feb. 24, 2006 (JP) ............................. 2006-047795

(51) Int. Cl.
*F16H 3/08* (2006.01)
(52) U.S. Cl. ........................................ 74/331; 74/330
(58) Field of Classification Search ................... 74/330, 74/331
See application file for complete search history.

(56) References Cited

U.S. PATENT DOCUMENTS 3,916,711 A * 11/1975 Hoyer ......................... 74/360
4,106,364 A * 8/1978 Zenker et al. ................. 74/745

FOREIGN PATENT DOCUMENTS

JP 2003-120764 4/2003

* cited by examiner

*Primary Examiner*—Tisha D Lewis
(74) *Attorney, Agent, or Firm*—Global IP Counselors, LLP

(57) ABSTRACT

A vehicle transmission is provided with two coaxially mounted input shafts having input gears, a pair of clutches to selectively transmit a driving torque of a power source to the input shafts, a plurality of output shafts having output gears, and a plurality of gear selectors. The gear selectors selectively connect and disconnect the gears to their respective shafts in order to selectively establish a plurality of forward driving speed ratios and at least one reverse driving speed ratio by selectively controlling the gear selectors and the first and second clutches. The gears are arranged such that only two sets of the gear pairs are used in establishing a torque transmitting path from one of the input shafts to a final reduction gear output shaft when at least one of a forward gear is selected other than a first forward gear.

11 Claims, 16 Drawing Sheets

| | C1 | C2 | 16c | S1 | | 17b | 16b | S2 | | 15b | S3 | | 11b | | 14b | S4 | | 15c | | 12b | S5 | | 13b |
|---|---|---|---|---|---|---|---|---|---|---|---|---|---|---|---|---|---|---|---|---|---|---|---|
| | | | | N | | | | N | | | N | | | | | N | | | | | N | | |
| Rev | ● | | | | | | ● | | | | | | | | | | | | | | ○ | | |
| 1st | ● | | ● | | | ● | ● | | | | | | | | | ○ | | | | | ○ | | |
| 2nd | | ● | | ○ | | | ● | | | | ○ | | | | | ○ | | | | | ○ | | |
| 3rd | ● | | | ○ | | | ◁ | | | | ○ | | | | | ○ | | | | | ○ | | |
| 4th | | ● | | ○ | | | | ○ | | | | | ▷ | | ● | | | | | ▷ | | | |
| 5th | ● | | | ○ | | | | | | ▷ | | | ● | | ◁ | | | | | ● | | | |
| 6th | | ● | | ○ | | | | | | ● | | ○ | | | | ○ | | | ▷ | | ◁ | | ▷ | |
| 7th | ● | | | ○ | | | | | ○ | ◁ | | ○ | | | | | | | ● | | | | ● | |
| 8th | | ● | | ○ | | | | | | | | ○ | | | | | | | | | | | | ◁ |

Fig. 3

VEHICLE TRANSMISSION

CROSS-REFERENCE TO RELATED APPLICATIONS

This application claims priority to Japanese Patent Application No. 2006-47795, filed on Feb. 24, 2006. The entire disclosure of Japanese Patent Application No. 2006-47795 is hereby incorporated herein by reference.

BACKGROUND OF THE INVENTION

1. Field of the Invention

The present invention relates generally to a vehicle transmission. More specifically, the present invention relates to a vehicle transmission that is known as a twin-clutch transmission.

2. Background Information

Some conventional transmissions are provided with two drive transmission paths using a pair of discrete clutches that selectively input an engine rotation into the drive transmission paths. One example of this type of conventional transmission is described in Japanese Patent Application Laid-Open Publication No. 2003-120764A (Cf., FIGS. 17 to 25). This type of transmissions is called a twin-clutch transmission, which can be shifted without interruption of a driving force transmission by alternately engaging these two clutches. The twin-clutch transmissions have high efficiency as compared to automatic transmissions that include a torque converter. Thus, twin-clutch transmissions are increasingly expected to be used in automobiles for substantial fuel consumption savings.

Basically, with the twin-clutch transmission described in this publication, the number of tooth engagements or sets of engaged paired gears for torque transfer is "3" for the first gear, the number of tooth engagements or sets of engaged paired gears for torque transfer is "1" for the second gear, the number of tooth engagements or sets of engaged paired gears for torque transfer is "1" for the third gear, the number of tooth engagements or engaged gear pairs for torque transfer is "3" for the fourth gear, the number of tooth engagements or se sets of engaged paired gears for torque transfer is "3" for the fifth gear, the number of tooth engagements or sets of engaged paired gears for torque transfer is "1" for the sixth gear, the number of tooth engagement for torque transfer is "1" for the seventh gear, the number of tooth engagements or sets of engaged paired gears for torque transfer is "3" for the eighth gear, and the number of tooth engagements or sets of engaged paired gears for torque transfer is "4" for the reverse gear.

In this publication, a first reduction gear pair is used for the first gear, fourth gear, fifth gear, eighth gear and reverse gear, but the direction of power transfer through the first reduction gear for the first gear and fifth gear and the direction of power transfer for the fourth gear, eighth gear and reverse gear are the opposite to each other. The direction of power transfer in the former case is as follows: "from the first input shaft to the first reduction gear pair to the sub shaft", and the direction of power transfer in the latter case is the opposite direction as follows: "the sub shaft to the first reduction gear pair to the first input shaft". On this account, when a reduction ratio of the first reduction pair is "r" for the first gear, it becomes "−1/r" for the reverse gear. Thus, the first reduction pair is being increased in speed for the first gear and it is being reduced in speed for the reverse gear.

In view of the above, it will be apparent to those skilled in the art from this disclosure that there exists a need for an improved vehicle transmission. This invention addresses this need in the art as well as other needs, which will become apparent to those skilled in the art from this disclosure.

SUMMARY OF THE INVENTION

It has been discovered that conventional twin-clutch transmissions, such as the one mentioned above, may have some potential drawbacks. For example, as mentioned above, the number of tooth engagements or engaged gear pairs for torque transfer is "3" for the first, fourth, fifth and eighth gears, while the number of tooth engagements or sets of engaged paired gears for torque transfer is "1" for the second, third, sixth and seventh gears. The number of tooth engagements or sets of engaged paired gears for torque transfer is "4" for the reverse gear. Generally, transmission efficiency decreases and intermeshing noise increases when number of tooth engagements or sets of engaged paired gears for torque transfer increases. Therefore, it is desirable to minimize the number of tooth engagements or sets of engaged paired gears for torque transfer in order to enhanced power transmission efficiency and restrained noise.

In the above mentioned conventional transmission, the number of tooth engagements or sets of engaged paired gears for torque transfer is "1" for the second, third, sixth and seventh gears. Thus, these gears can run without a reduction in power transmission efficiency or an increase of intermeshing noise. However, because the number of tooth engagements or sets of engaged paired gears for torque transfer is "3" or "4" for the other driving speed ratios (the first, fourth, fifth, eighth and reverse gears), the above mentioned conventional transmission has a problem in that the power transmission efficiency decreases and intermeshing noise occurs when running in each of these gears.

As mentioned above, because the reduction ratio of the first reduction gear pair in the above mentioned conventional transmission acts for "an increase in speed" for the reverse driving speed ratio, a reduction ratio of each of the other gear pairs needs to be a considerably large reduction ratio taking this increase in speed into account. Use of a large diameter gear wheel cannot be avoided in order to realize such considerably large reduction ratio and therefore, the above-mentioned prior art has a problem that limitation in a layout grows big.

The present invention was contrived in view of the foregoing drawbacks in the above mentioned conventional transmission. One object of the present invention is to provide a compact vehicle transmission that has superior transmission efficiency and is quiet by optimizing the number of tooth engagements or sets of engaged paired gears for torque transfer for each of driving speed ratios with freedom in selection of speed ratio being secured.

In order to achieve the above mentioned objects and other objects of the present invention, a vehicle transmission is provided that basically comprises a first input shaft, a second input, a first clutch, a second clutch, a first output shaft, a second output shaft, a countershaft and a plurality of gear selectors. The first input shaft has a plurality of first input gears. The second input shaft is coaxially arranged with respect to the first input shaft and has a plurality of second input gears. The first clutch is arranged to operatively transmit a driving torque of a power source to the first input shaft. The second clutch is arranged to operatively transmit the driving torque of the power source to the second input shaft. The first output shaft has a plurality of first output gears engaged with selected ones of the first and second input gears to define a plurality of gear pairs that each selectively receives the driving torque from one of the first and second input shafts. The second output shaft has a plurality of second output gears engaged with selected ones of the first and second input gears to define a plurality of gear pairs that each selectively receives the driving torque from one of the first and second input shafts. The countershaft has a plurality of third output gears with the countershaft being disposed in parallel with the first and second output shafts such that the third output gears are engaged with selected ones of the first and second input gears to define a plurality of gear pairs that each selectively receives the driving torque from one of the first and second input shafts. The gear selectors are operatively disposed to selectively connect and disconnect the first output shaft to selected ones of the first output gears, the second output shaft to selected ones of the second output gears, and the countershaft to selected ones of the third output gears in order to selectively establish a plurality of forward driving speed ratios and at least one reverse driving speed ratio by selectively controlling the gear selectors and the first and second clutches. The first input gears, the second input gears, the first output gears, the second output gears and the third output gears are selectively connected such that no more than two sets of the gear pairs are used in establishing a torque transmitting path from one of the first and second input shafts to a final reduction gear output shaft when a forward gear is selected among the forward driving speed ratios other than a first forward gear.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 3 is a clutch engagement operating chart for the transmission in accordance with the first embodiment of the present invention;

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
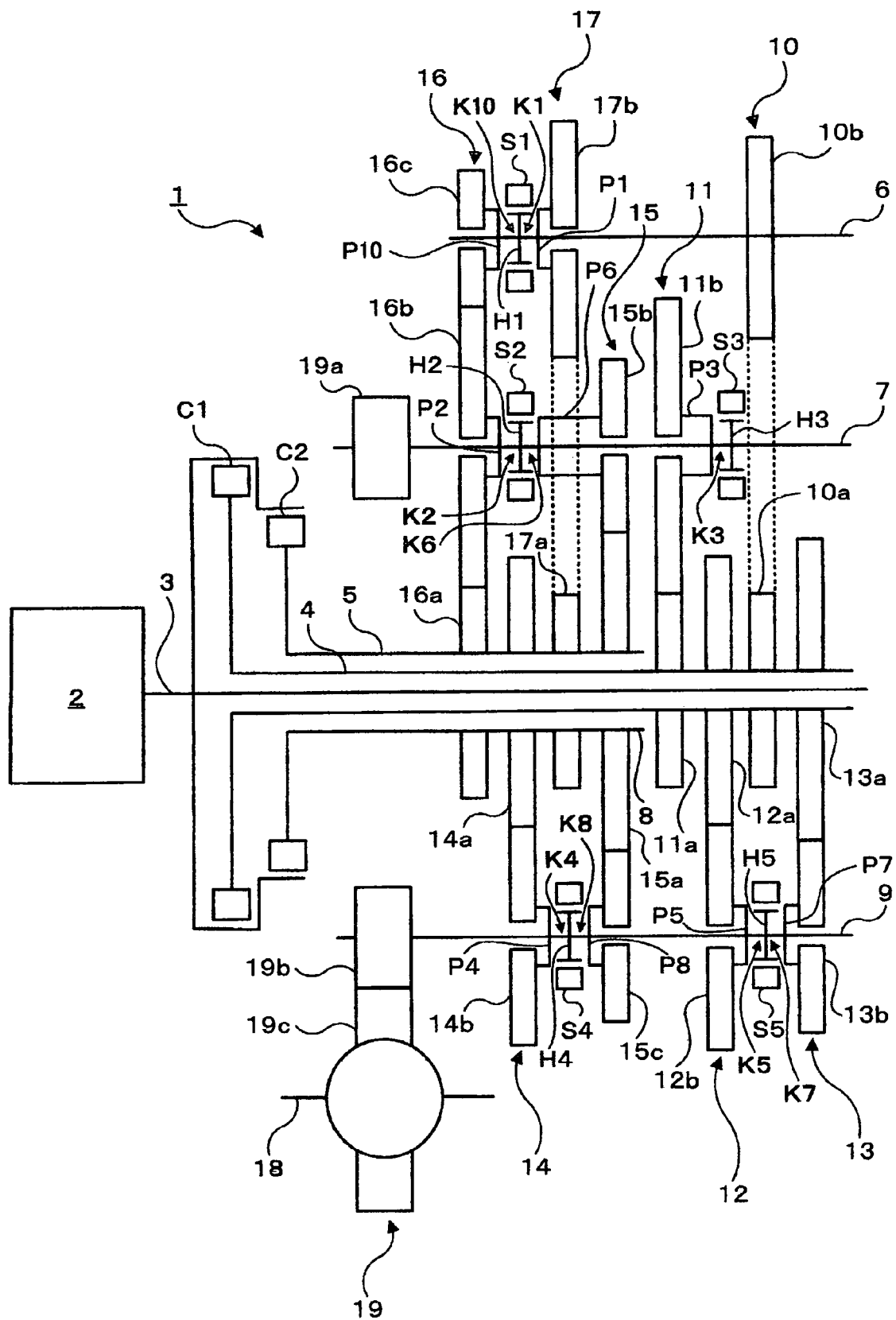
FIG. 1 is a simplified schematic view (skeleton diagram) of a vehicle transmission in accordance with a first embodiment of the present invention.

Referring initially to FIG. 1, a simplified schematic view of a vehicle transmission 1 is illustrated in accordance with a second embodiment of the present invention. The vehicle transmission 1 is operatively coupled to an engine 2 that is a main power source by a main transmission shaft 3, a first input shaft 4 and a second input shaft 5. The first and second input shafts 4 and 5 are coaxial input shafts that are in coaxial relationship with the transmission shaft 3. Torque is selectively transmitted from the transmission shaft 3 to the first and second input shafts 4 and 5 by a pair of discrete engagement-elements C1 and C2 ("first clutch C1 and second clutch C2"), respectively. In particular, the first clutch C1 is disposed between the transmission shaft 3 and the first input shaft 4, while the second clutch C2 is disposed between the transmission shaft 3 and the second input shaft 5. Thus, the first clutch C1 provides or interrupts a torque transmission between the transmission shaft 3 and the first input shaft 4, while the second clutch C2 provides or interrupts a torque transmission between the transmission shaft 3 and the second input shaft 5. Preferably, each of the first and second clutches C1 and C2 is a frictional clutch, for example that is selectively controlled by a controller (not illustrated). The first and second clutches C1 and C2 can be shifted to any one of a fully closed state (i.e., engagement state) that provides a torque transmission, an open state (i.e., disengagement state) that does not provide a torque transmission and a slip state that is an intermediate state between them.

Furthermore, the transmission 1 further includes a first countershaft 6, a first output shaft 7, a second countershaft 8 and a second output shaft 9. These four shafts 6 to 9 are arranged in parallel relationship with the transmission shaft 3, the first input shaft 4 and the second input shaft 5. In addition, the second countershaft 8 and the second input shaft 5 are coupled together for rotation. These four shafts 6 to 9 are provided with a plurality of gear pairs for shifting between the various driving speed ratios. In particular, the transmission 1 further includes a first/reverse gear pair 10, a third gear pair 11, a fifth gear pair 12, a seventh gear pair 13, a fourth gear pair 14, a sixth/eighth gear pair 15, a first/second/reverse gear pair 16 and a first gear pair 17. A final reduction gear output shaft 18 is arranged in parallel relationship to the first and second output shafts 7 and 9 with an output shaft gear pair 19 arranged between the final reduction gear output shaft 18 and the first and second output shafts 7 and 9. Also the transmission 1 has a plurality of intermeshing clutch mechanisms or gear selectors K1 to K10 for selectively connecting and disconnecting the gear pairs to establish the forward driving speed ratios and the reverse driving speed ratio.

The first/reverse gear pair 10 is disposed between the first input shaft 4 and the first countershaft 6. This first/reverse gear pair 10 includes a first/reverse gear 10a installed on the first input shaft 4 for rotation as one body and a first/reverse gear 10b installed on the first countershaft 6 for rotation as one body. The first/reverse gears 10a and 10b mesh with each other in a first forward gear or a first reverse gear to transmit torque from the first input shaft 4 to the first countershaft 6. Here, the first/reverse gear 10b has a greater number of teeth than the first/reverse gear 10a. This causes a reduction in speed during torque transmission from the first/reverse gear 10a to the first/reverse gear 10b in the first forward gear or first reverse gear.

The third gear pair 11 is disposed between the first input shaft 4 and the first output shaft 7. This third gear pair 11 includes a third gear 11a installed on the first input shaft 4 for rotation as one body and a third gear 11b arranged coaxially with the first output shaft 7 for free rotation. The third gears 11a and 11b mesh with each other in the third forward gear to transmit torque from the first input shaft 4 to the first output shaft 7. Here, the third gear 11b has a greater number of teeth than the third gear 11a. This causes a reduction in speed during torque transmission from the first input shaft 4 to the first output shaft 7 in the third forward gear.

The fifth gear pair 12 is disposed between the first input shaft 4 and the second output shaft 9. This fifth gear pair 12 includes a fifth gear 12a installed on the first input shaft 4 for rotation as one body and a fifth gear 12b arranged coaxially with the second output shaft 9 for free rotation. The fifth gears 12a and 12b mesh with each other in the fifth forward gear to transmit torque from the first input shaft 4 to the second output shaft 9. Here, the fifth gear 12b has a fewer number of teeth than the fifth gear 12a. This causes an increase in speed during torque transmission from the first input shaft 4 to the second output shaft 9 in the fifth forward gear.

The seventh gear pair 13 is disposed between the first input shaft 4 and the second output shaft 9. This seventh gear pair 13 includes a seventh gear 13a installed on the first input shaft 4 for rotation as one body and a seventh gear 13b arranged coaxially with the second output shaft 9 for free rotation. The seventh gears 13a and 13b mesh with each other in the seventh forward gear to transmit torque from the first input shaft 4 to the second output shaft 9. Here, the seventh gear 13b has a fewer number of teeth than the seventh gear 13a. This causes an increase in speed during torque transmission from the first input shaft 4 to the second output shaft 9 in the seventh forward gear.

The fourth gear pair 14 is disposed between the second countershaft 8 and the second output shaft 9. This fourth gear pair 14 includes a fourth gear 14a installed on the second countershaft 8 for rotation as one body and a fourth gear 14b arranged coaxially with the second output shaft 9 for free rotation. The fourth gears 14a and 14b mesh with each other in the fourth forward gear to transmit torque from the second countershaft 8 to the second output shaft 9. Here, the fourth gear 14b has a fewer number of teeth than the fourth gear 14a. This causes an increase in speed during torque transmission from the second countershaft 8 to the second output shaft 9 in the fourth forward gear.

The sixth/eighth gear pair 15 is disposed between the second countershaft 8 and the first output shaft 7 and between the second countershaft 8 and the second output shaft 9. This sixth/eighth gear pair 15 includes a sixth/eighth gear 15a installed on the second countershaft 8 for rotation as one body, a sixth gear 15b arranged coaxially with the first output shaft 7 for free rotation, and an eighth gear 15c arranged coaxially with the second output shaft 9 for free rotation. In the sixth forward gear, the sixth/eighth gear 15a and the sixth gear 15b mesh with each other during torque transmission from the countershaft 8 to the first output shaft 7. In the eighth forward gear, the sixth/eighth gear 15a and eighth gear 15c mesh with each other during the second countershaft 8 to the second output shaft 9. Here, the sixth gear 15b has a fewer number of teeth than the sixth/eighth gear 15a. This causes an increase in speed during torque transmission from the second countershaft 8 to the first output shaft 7 in the sixth forward gear. The eighth gear 15c has a fewer number of teeth than the sixth/eighth gear 15a. This causes an increase in speed during torque transmission from the second countershaft 8 to the second output shaft 9 in the eighth forward gear.

The first/second/reverse gear pair 16 is disposed among the second countershaft 8, the first countershaft 6 and the first output shaft 7. This first/second/reverse gear pair 16 includes a first/second gear 16a installed on the second countershaft 8 for rotation therewith, a first/second/reverse gear 16b arranged coaxially with the first output shaft 7 for free rotation, and a reverse gear 16c arranged coaxially with the first countershaft 6 for free rotation. The first/second/reverse gear pair 16 is arranged for torque transmission from the second countershaft 8 to the first output shaft 7 in the first and second forward gears and for torque transmission from the first countershaft 6 to the first output shaft 7 in the reverse gear. Here, the first/second/reverse gear 16b has a greater number of teeth than the first/second gear 16a. This causes a reduction in speed during torque transmission from the second countershaft 8 to the first output shaft 7 in the first forward gear and the second forward gear. The first/second/reverse gear 16b has a greater number of teeth than the reverse gear 16c. This causes a reduction in speed during torque transmission from the first countershaft 6 to the first output shaft 7 in the reverse gear.

The first gear pair 17 is disposed between the second countershaft 8 and the first countershaft 6. This first gear pair 17 includes a first gear 17a installed on the second countershaft 8 for rotation therewith and a first gear 17b installed on the first countershaft 6 for rotation therewith. The first gears 17a and 17b mesh with each other in the first forward gear to transmit torque from the first countershaft 6 to the second countershaft 8. Here, the first gear 17b has a greater number of teeth than the first gear 17a. This causes an increase in speed during torque transmission from the first countershaft 6 to the second countershaft 8 in the first forward gear.

The two freely rotatable gears (the reverse gear 16c and the first gear 17b) are arranged on the first countershaft 6 from the left of the drawing sequentially for free rotation, with two intermeshing clutch mechanisms or gear selectors K10 and K1 arranged to selectively connect these gears 16c and 17b to the first countershaft 6. In particular, the hub sleeve S1 is arranged between the reverse gear 16c and the first gear 17b in spline-connection with the clutch hub H1 that is fixedly connected to the first countershaft 6 as one body. The hub sleeve S1 can be pushed axially toward the reverse gear 16c into engagement with the spline P10, so that the hub sleeve S1 makes a rotationally fixed connection between the reverse gear 16c and the first countershaft 6. Accordingly, this arrangement constitutes the reverse gear selector K10. In contrast, when the hub sleeve S1 is pushed axially toward the first gear 17b into engagement with the spline P1, the above-mentioned hub sleeve S1 makes a rotationally fixed connection between the first gear 17b and the first countershaft 6. Accordingly, this arrangement constitutes the first gear selector K1.

The three freely rotatable gears (the first/second/reverse gear 16b, the sixth gear 15b and the third gear 11b) are arranged on the first output shaft 7 from the left of the drawing sequentially for free rotation, with three intermeshing clutch mechanisms or selectors K2, K6 and K3 arranged to selectively connect these gears 16b, 15b and 11b to the first output shaft 7. In particular, the hub sleeve S2 is arranged between the first/second/reverse gear 16b and the sixth gear 15b in spline-connection with the clutch hub H2 that is fixedly connected to the first output shaft 7 as one body. The hub sleeve S2 can be pushed axially toward the first/second/reverse gear 16b into engagement with the spline P2. Thus, the hub sleeve S2 makes a rotationally fixed connection between the first/second/reverse gear 16b and the first output shaft 7. Accordingly, this arrangement constitutes the second gear selector K2. In contrast, when the hub sleeve S2 is pushed axially toward the sixth gear 15b into engagement with the spline P6, the hub sleeve S2 makes a rotationally fixed connection between the sixth gear 15b and the first output shaft 7. Accordingly, this arrangement constitutes the sixth gear selector K6. In addition, the hub sleeve S3 is arranged on the right side, viewing in the drawing, of the third gear 11b in spline-connection with the clutch hub H3 that is fixedly connected to the first output shaft 7 as one body. The hub sleeve S3 can be pushed axially toward the third gear 11b into engagement with the spline P3. Thus, the hub sleeve S3 makes a rotationally fixed connection between the third gear 11b and the first output shaft 7. Accordingly, this arrangement constitutes the third gear selector K3.

The four freely rotatable gears (the fourth gear 14b, the eighth gear 15c, the fifth gear 12b and the seventh gear 13b) are arranged on the second output shaft 9 from the left of the drawing sequentially for free rotation, with four intermeshing clutch mechanisms or selectors K4, K8, K5 and K7 arranged to selectively connect these gears to the second output shaft 9. In particular, the hub sleeve S4 is arranged between the fourth gear 14b and the eighth gear 15c in spline-connection with the clutch hub H4 that is fixedly connected to the second output shaft 9 as one body. The hub sleeve S4 can be pushed axially toward the fourth gear 14b into engagement with the spline P4. Thus, the hub sleeve S4 makes a rotationally fixed connection between the fourth gear 14b and the second output shaft 9. Accordingly, this arrangement constitutes the fourth gear selector K4. In contrast, when the hub sleeve S4 is pushed axially toward the eighth gear 15c into engagement with the spline P8, the hub sleeve S4 makes a rotationally fixed connection between the eighth gear 15c and the second output shaft 9. Accordingly, this arrangement constitutes the eighth gear selector K8. In addition, the hub sleeve S5 is arranged between the fifth gear 12b and the seventh gear 13b in spline-connection with the clutch hub H5 that is the fixedly connected to the second output shaft 9 as one body. The hub sleeve S5 can be pushed axially toward the fifth gear 12b into engagement with the spline P5. Thus, the hub sleeve S5 makes a rotationally fixed connection between the fifth gear 12b and the second output shaft 9. Accordingly, this arrangement constitutes the fifth gear selector K5. In contrast, when the hub sleeve S5 is pushed axially toward the seventh gear 13b into engagement with the spline P7, the hub sleeve S5 makes a rotationally fixed connection between the seventh gear 13b and the second output shaft 9. Accordingly, this arrangement constitutes the seventh gear selector K7.

The output shaft gear pair 19 is arranged on the first output shaft 7 and the second output shaft 9, and also on the final reduction gear output shaft 18 that is arranged in parallel relationship to these two shafts (the first output shaft 7 and the second output shaft 9). This output shaft gear pair 19 includes a first output shaft output gear 19a installed on the first output shaft 7 for rotation therewith, a second output shaft output gear 19b installed on the second output shaft 9 for rotation therewith, and a final reduction gear output shaft gear 19c arranged for the final reduction gear output shaft 18. In the first, second, third, and sixth forward gears and reverse gear, there is torque transmission from the first output shaft output gear 19a to the final reduction gear output shaft gear 19c, and in the fourth, fifth, seventh and eighth forward gears, there is torque transmission from the second output shaft output gear 19b to the final reduction gear output shaft gear 19c. Here, the final reduction gear output shaft gear 19c has a greater number of teeth than the first and second output shaft output gears 19a and 19b. This causes a reduction in speed during torque transmission from the first output shaft 7 to the final reduction gear output shaft 18 and during torque transmission from the second output shaft 9 to the final reduction gear output shaft 18.

Figure 2:
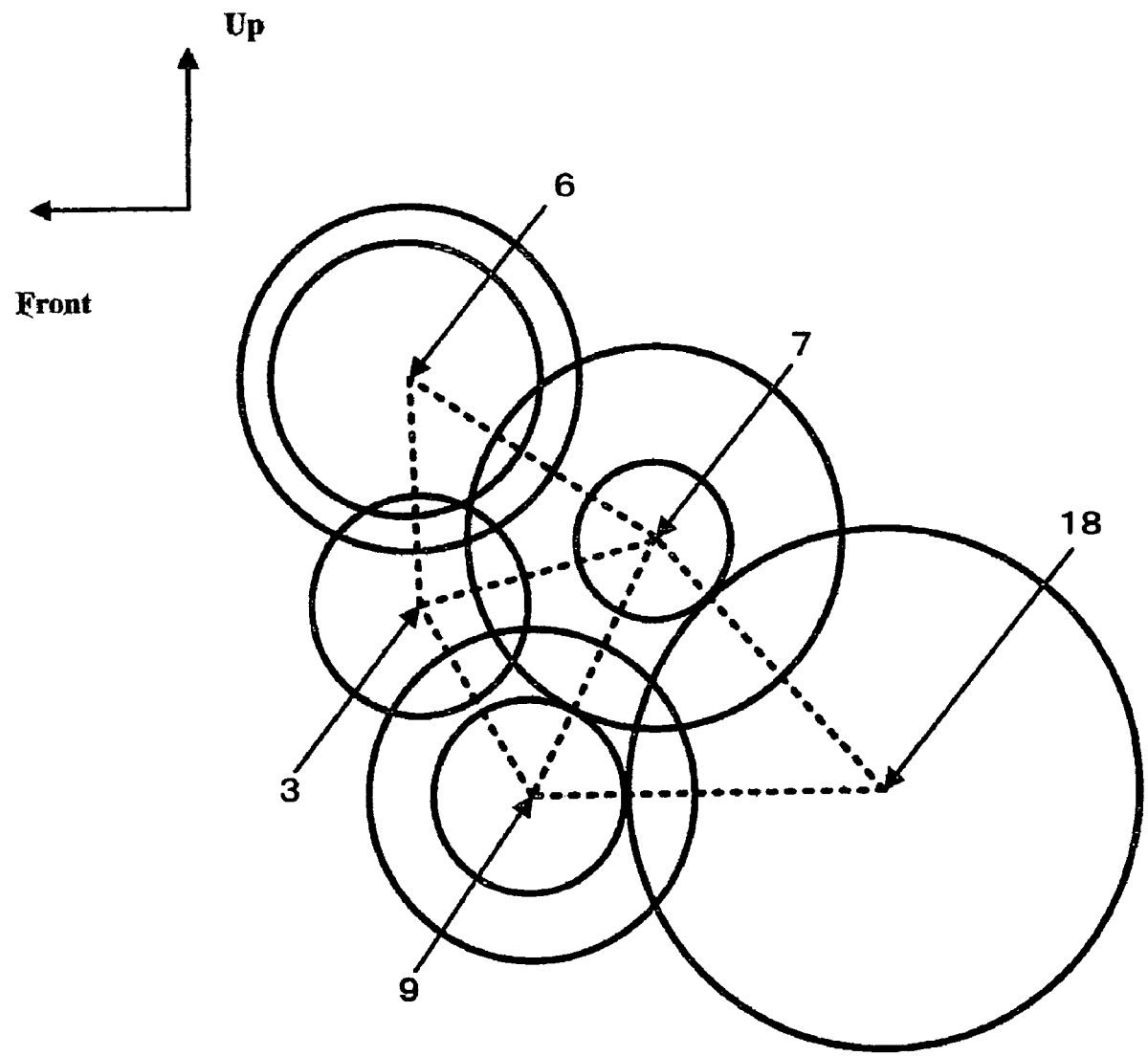
FIG. 2 is simplified schematic view of an arrangement the axes for the shafts of the vehicle transmission in accordance with the first embodiment of the present invention.

FIG. 2 is an end view of the transmission as viewed along the axes of the shafts. This end view, which can be called a side view of a vehicle, shows the axes viewing the engine 2 from the transmission 1. The transmission shaft 3 is coaxial with the output shaft (engine crankshaft or the like) of the engine 2, the second countershaft 8, the first input shaft 4 and the second input shaft 5, and the final reduction gear output shaft 18 is drivingly connected to driving wheels, not illustrated, via a driving shaft, not illustrated. The first output shaft 7 is arranged above (vertically above) a plane that interconnects the axis of the transmission shaft 3 and the axis of the final reduction gear output shaft 18. The second output shaft 9 is arranged below (vertically below) the plane. The first countershaft 6 is arranged above further than the first output shaft 7 is.

The transmission 1 of the first embodiment that has such a constitution can set eight forward driving speed ratios and one reverse driving speed ratio.

FIG. 3 is a clutch engagement operation chart corresponding to the transmission 1 of the first embodiment, showing engagement and disengagement states of each of the clutches (the first clutch C1 and second clutch C2) and each of the intermeshing clutch mechanisms or gear selectors (K1, . . . K10) to establish each of the above-mentioned driving speed ratios (eight forward driving speed ratios and one reverse driving speed ratio). In FIG. 3, a number in a column of each hub sleeve (S1, S2 . . . S5) is a reference numeral of the gear which the hub sleeve can be pushed into engagement with, and "N" shows a neutral (off) position at which the hub sleeve is out of engagement with the associated gears. Each dot shows engagement state for torque transmission, each circle shows that it is essential to take the neutral position, each triangle shows engagement state to stand by for a down shift, each reverse triangle shows engagement state to stand by for an up shift, and each blank shows disengagement state.

Hereinafter, there is description of each of the driving speed ratio.

The first forward gear is established by engaging the first clutch C1 when the hub sleeve S1 makes a rotationally fixed connection between the first gear 17b and the first countershaft 6 and the hub sleeve S2 makes a rotationally fixed connection between the first/second/reverse gear 16b and the first output shaft 7.

Figure 4:
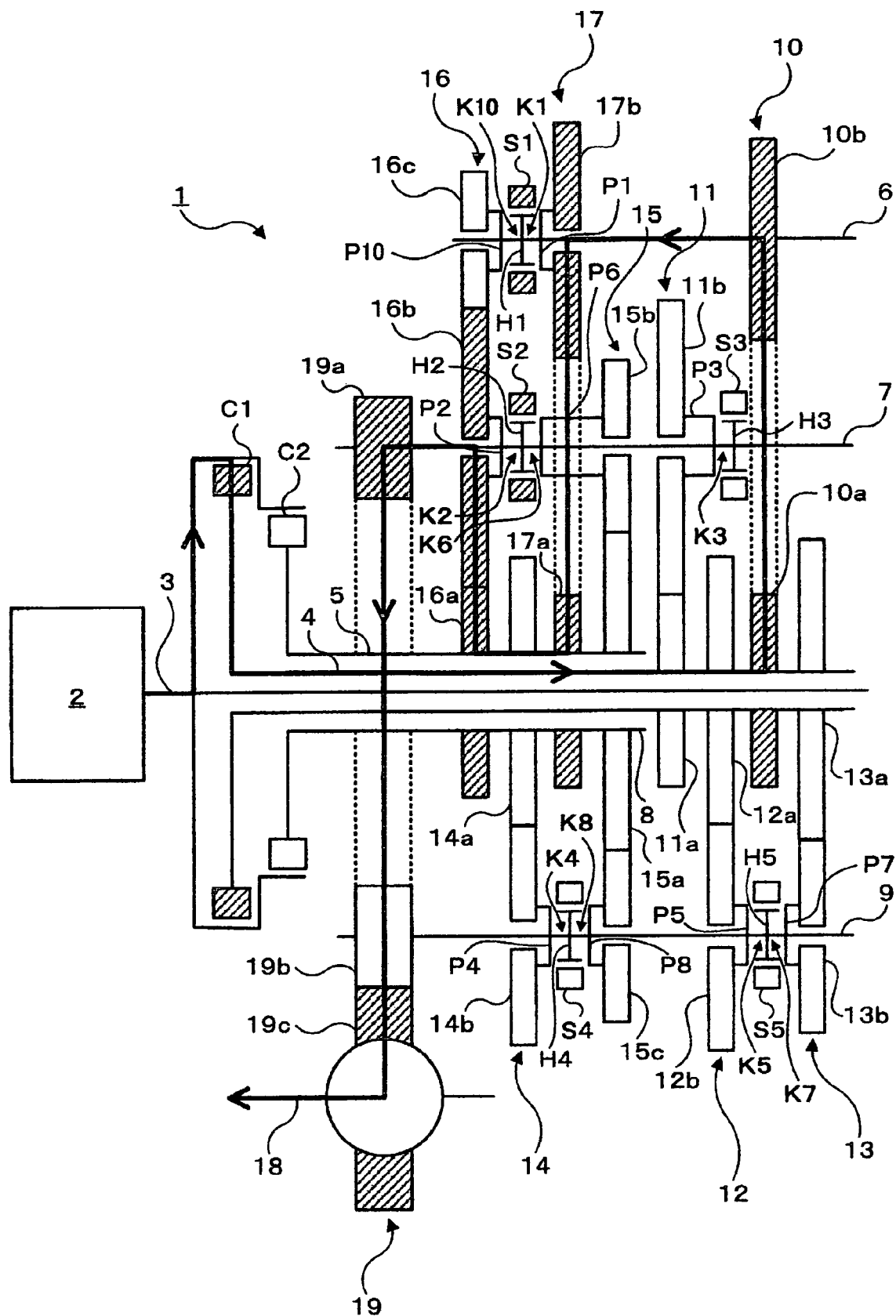
FIG. 4 is a simplified schematic view (skeleton diagram) of the vehicle transmission showing the first forward gear being established in accordance with the first embodiment of the present invention.

FIG. 4 shows the power (torque) path when the first gear is established in the first embodiment. As shown in this diagram, the shadowed portions and the bold line illustrated in FIG. 4 show that, in the first forward gear, the engine torque transmitted via the engaged first clutch C1 is transmitted, at first, from the first input shaft 4 to the first countershaft 6 via the first/reverse gear 10, next, from the first countershaft 6 to the second input shaft 5 via the engaged first gear selector K1 and the first gear pair 17, more, from this second input shaft 5 to the first output shaft 7 via the first/second/reverse gear pair 16 and the engaged second gear selector K2, and, finally, from the first output shaft 7 to the final reduction gear output shaft 18 via the output shaft gear pair 19. Therefore, the first gear that provides the largest speed ratio among the forward driving speed ratios is established. In the first forward gear, four tooth engagements or engaged gear pairs occur, i.e., one at the first/reverse gear pair 10, another at the first gear pair 17, another at first/second/reverse gear pair 16, and another at the output shaft gear pair 19. In other words, the number of tooth engagements in the first forward gear is "4".

An up shift from the first gear to the second gear is executed by gradually disengaging the first clutch C1 in the above-mentioned first forward gear state and gradually engaging the second clutch C2.

Figure 5:
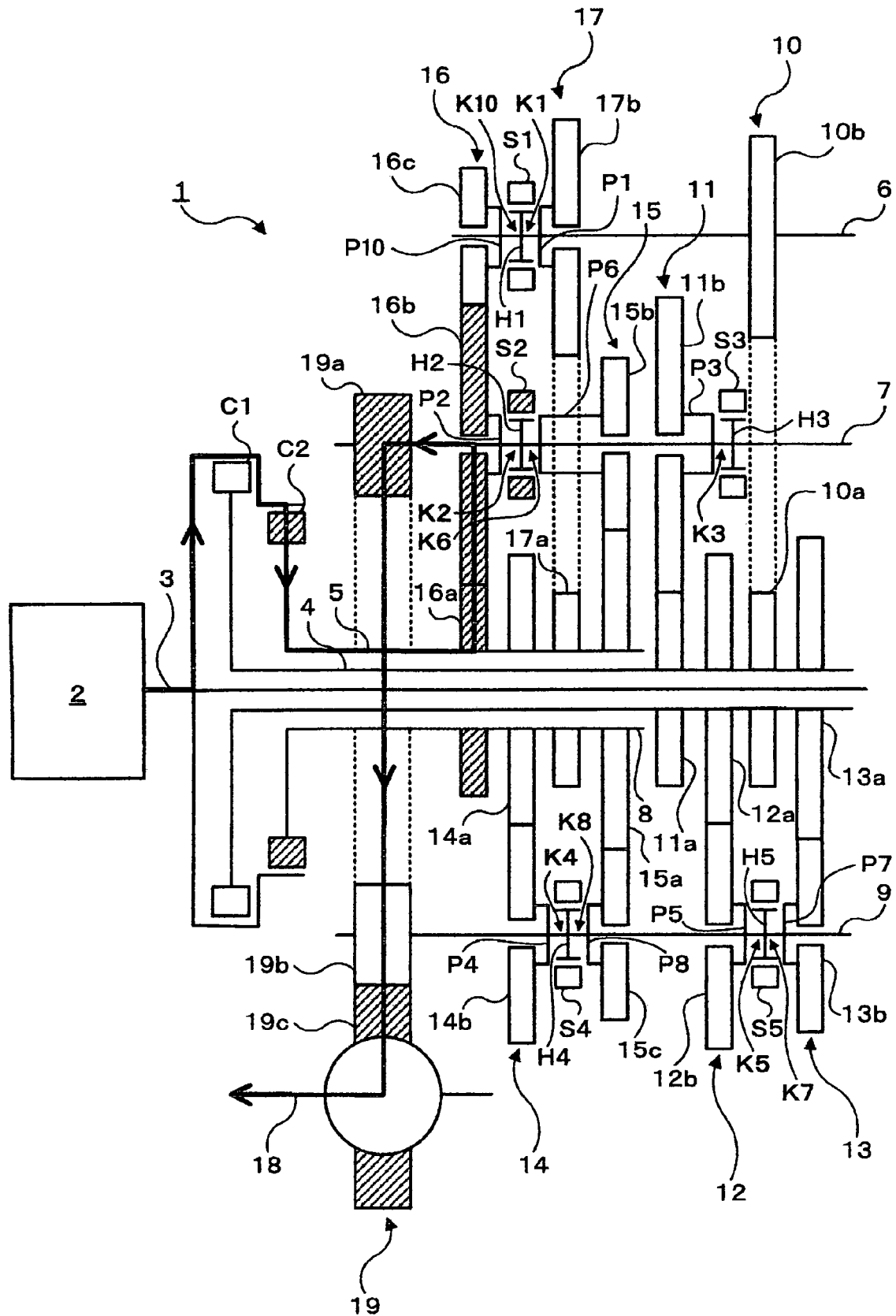
FIG. 5 is a simplified schematic view (skeleton diagram) of the vehicle transmission showing the second forward gear being established in accordance with the first embodiment of the present invention.

FIG. 5 shows the power (torque) path when the second gear is established in the first embodiment. As shown in this diagram, in the second forward gear, the engine torque is transmitted by the second clutch C2. And, the shadowed portions and the bold line illustrated in FIG. 4 show that the engine torque is transmitted from the second input shaft 5 to the first output shaft 7 via the first/second/reverse gear pair 16 and the engaged second gear selector K2, and then from the first output shaft 7 to the final reduction gear output shaft 18 via the output shaft gear pair 19. Therefore, the second forward gear that provides a smaller speed ratio than that for the first forward gear is established because the output shaft gear pair 19 and the first/second/reverse gear pair 16 function to reduce speed in the torque path. In the second forward gear, two tooth engagements or engaged gear pairs occur, i.e., one at the first/second/reverse gear pair 16, and the other at the output shaft gear pair 19. Thus, the number of tooth engagements or engaged gear pairs in the second forward gear is "two".

In this second forward gear, placing the hub sleeve S3 in the position to make a fixed rotational connection between the third gear 11b and the first output shaft 7 will put the transmission 1 in standby state for an upshift to the third gear. In this standby state, gradually disengaging the second clutch C2 and gradually engaging the first clutch C1 establishes the third forward gear.

Figure 6:
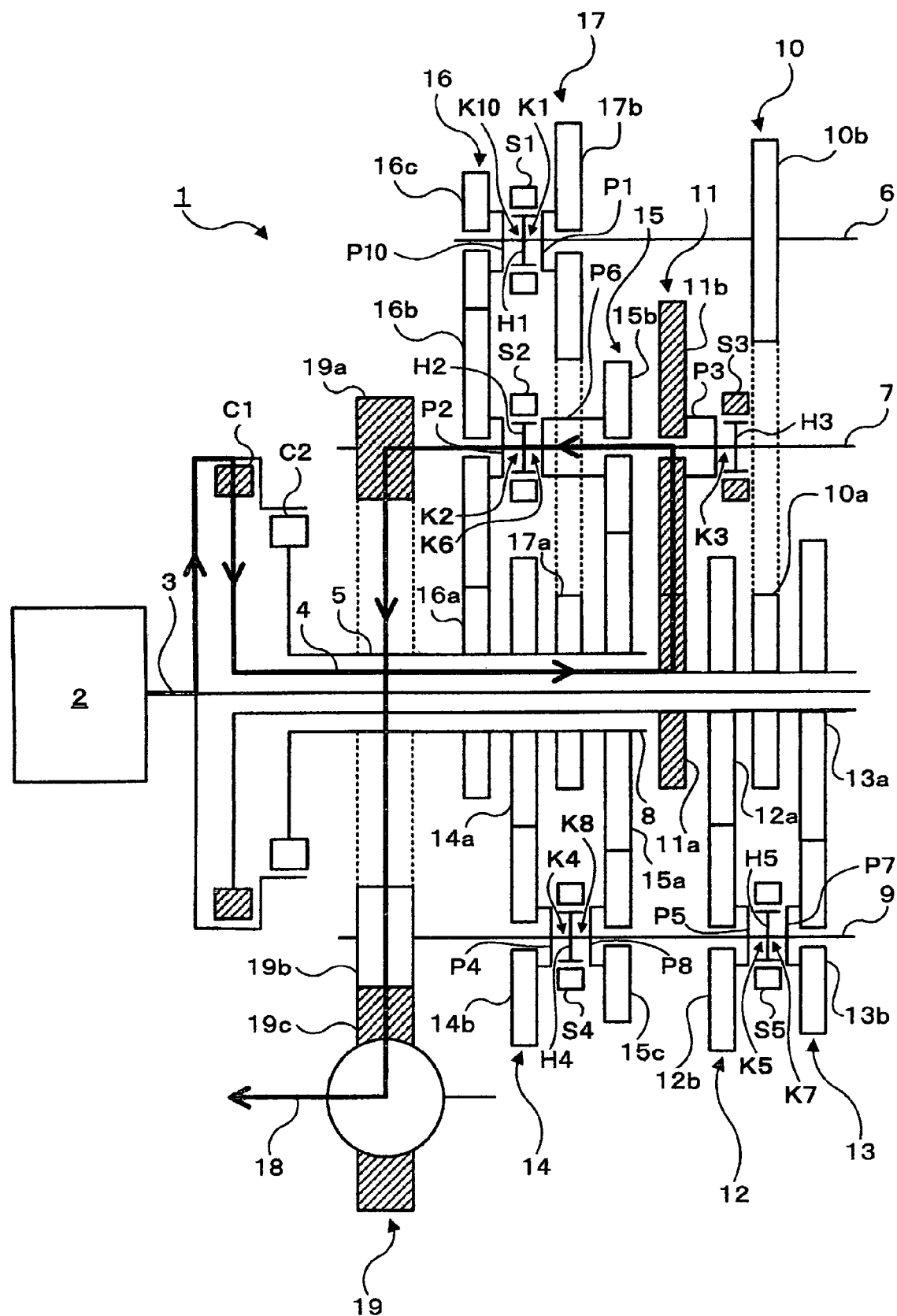
FIG. 6 is a simplified schematic view (skeleton diagram) of the vehicle transmission showing the third forward gear being established in accordance with the first embodiment of the present invention.

FIG. 6 shows the power (torque) path when the third gear is established in the first embodiment. As shown in this diagram, in the third forward gear, the engine torque that is transmitted by the engaged first clutch C1 to the first input shaft 4 is transmitted to the first output shaft 7 via the third gear pair 11 and the engaged third gear selector K3, and then from the first output shaft 7 to the final reduction gear output shaft 18 via the output shaft gear pair 19. The third gear that provides a speed ratio smaller than that for the second gear is established by setting that the total gear ratio due to the third gear pair 11 and the gears (the first output shaft output gear 19a, the final reduction gear output shaft gear 19c) of the output shaft gear pair 19 is smaller than the total gear ratio due to the two gears (the first/second gear 16a, the first/second/reverse gear 16b) of the first/second/reverse gear pair 16 and the gears (the first output shaft output gear 19a, the final reduction gear output shaft gear 19c) of the output shaft gear pair 19. In the third forward gear, two tooth engagements or engaged gear pairs occur, i.e., one at the third gear pair 11, and the other at the output shaft gear pair 19. Thus, the number of tooth engagements or engaged gear pairs in the third forward gear is "two".

In this third forward gear, placing the hub sleeve S4 in the position to make a fixed rotational connection between the fourth gear 14b and the second output shaft 9 will put the transmission 1 in standby state for an upshift to the fourth gear. In this standby state, gradually disengaging the second clutch C1 and gradually engaging the first clutch C2 establishes the fourth forward gear.

Figure 7:
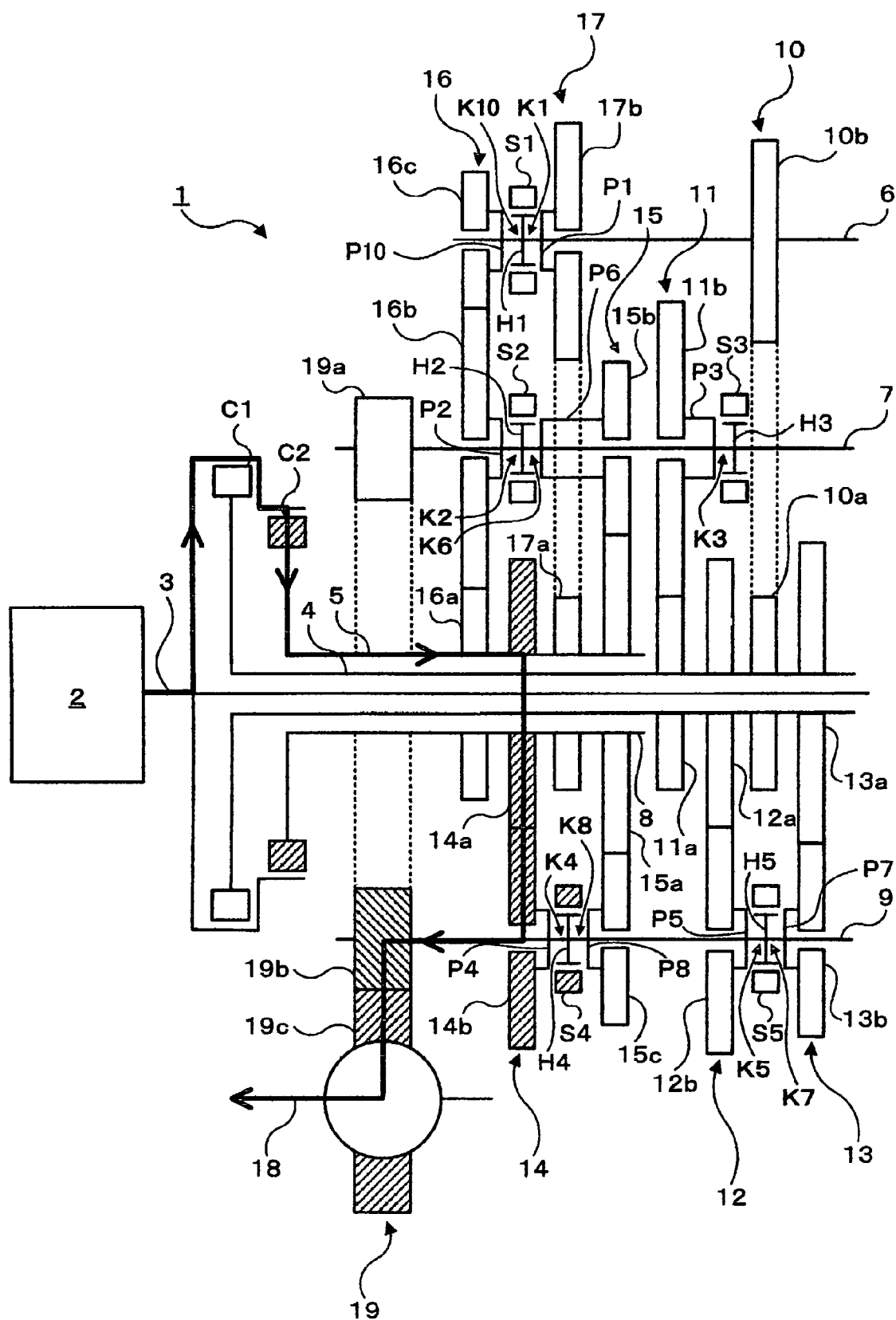
FIG. 7 is a simplified schematic view (skeleton diagram) of the vehicle transmission showing the fourth forward gear being established in accordance with the first embodiment of the present invention.

FIG. 7 shows the power (torque) path when the fourth gear is established in the first embodiment. As shown in this diagram, in the fourth forward gear, the engine torque that is transmitted by the engaged second clutch C2 to the second input shaft 5 is transmitted to the second output shaft 9 via the fourth gear pair 14 and the engaged fourth gear selector K4, and then from the second output shaft 9 to the final reduction gear output shaft 18 via the output shaft gear pair 19. The fourth gear that provides a speed ratio smaller than that for the third gear is established by setting that the total gear ratio due to the fourth gear pair 14 and the gears (the first output shaft output gear 19a, the final reduction gear output shaft gear 19c) of the output shaft gear pair 19 is smaller than the total gear ratio due to the third gear pair 11 and the gears (the first output shaft output gear 19a, the final reduction gear output shaft gear 19c) of the output shaft gear pair 19. In the fourth forward gear, two tooth engagements or engaged gear pairs occur, i.e., one at the fourth gear pair 14, and the other at the output shaft gear pair 19. Thus, the number of tooth engagements or engaged gear pairs in the fourth forward gear is "two".

In this fourth forward gear, placing the hub sleeve S5 in the position to make a fixed rotational connection between the fifth gear 12b and the second output shaft 9 will put the transmission 1 in standby state for an upshift to the fifth gear. In this standby state, gradually disengaging the second clutch C2 and gradually engaging the first clutch C1 establishes the fifth forward gear.

Figure 8:
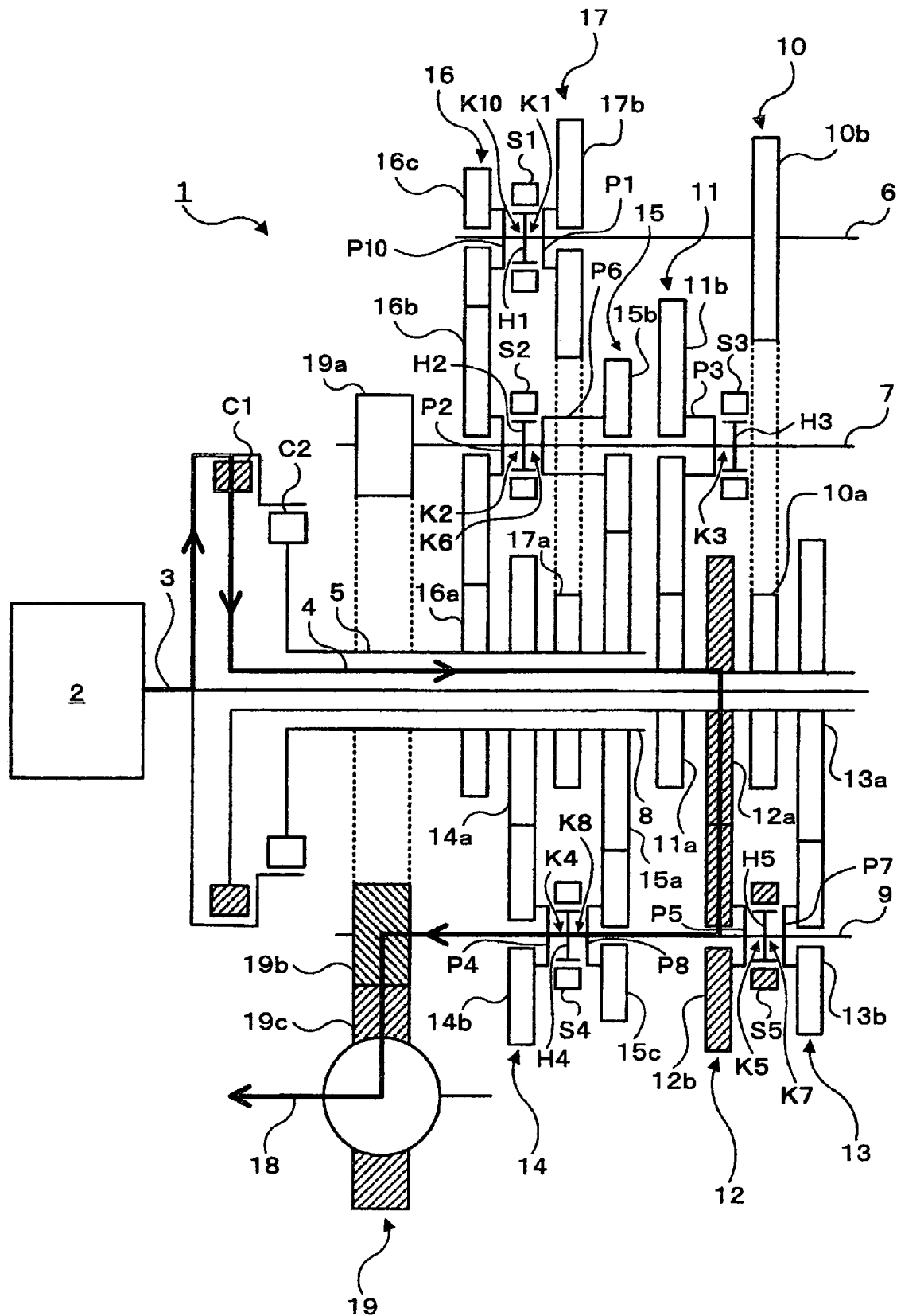
FIG. 8 is a simplified schematic view (skeleton diagram) of the vehicle transmission showing the fifth forward gear being established in accordance with the first embodiment of the present invention

FIG. 8 shows the power (torque) path when the fifth gear is established in the first embodiment. As shown in this diagram, in the fifth forward gear, the engine torque that is transmitted by the engaged first clutch C1 to the first input shaft 4 is transmitted to the second output shaft 9 via the fifth gear pair 12 and the engaged fifth gear selector K5, and then from the second output shaft 9 to the final reduction gear output shaft 18 via the output shaft gear pair 19. The fifth gear that provides a speed ratio smaller than that for the fourth gear is established by setting that the total gear ratio due to the fifth gear pair 12 and the gears (the first output shaft output gear 19a, the final reduction gear output shaft gear 19c) of the output shaft gear pair 19 is smaller than the total gear ratio due to the fourth gear pair 14 and the gears (the first output shaft output gear 19a, the final reduction gear output shaft gear 19c) of the output shaft gear pair 19.

In the fifth forward gear, two tooth engagements or engaged gear pairs occur, i.e., one at the fifth gear pair 12, and the other at the output shaft gear pair 19. Thus, the number of tooth engagements or engaged gear pairs in the fifth forward gear is "two". In this fifth forward gear, placing the hub sleeve S2 in the position to make a fixed rotational connection between the sixth gear 15b and the first output shaft 7 will put the transmission 1 in standby state for an upshift to the sixth gear. In this standby state, gradually disengaging the first clutch C1 and gradually engaging the second clutch C2 establishes the sixth forward gear.

Figure 9:
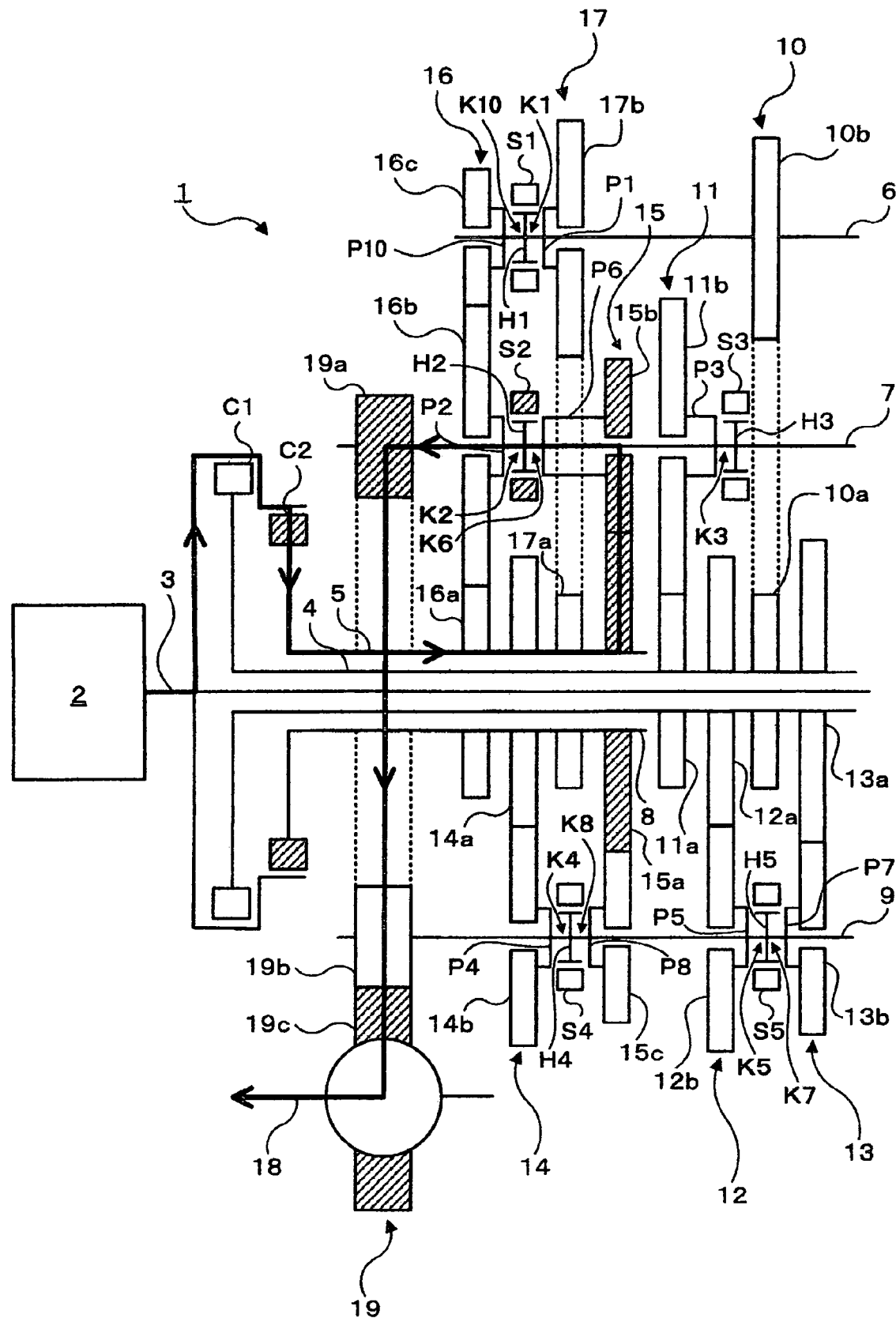
FIG. 9 is a simplified schematic view (skeleton diagram) of the vehicle transmission showing the sixth forward gear being established in accordance with the first embodiment of the present invention.

FIG. 9 shows the power (torque) path when the sixth gear is established in the first embodiment. As shown in this diagram, in the sixth forward gear, the engine torque that is transmitted by the engaged second clutch C2 to the second input shaft 5 is transmitted to the first output shaft 7 via the sixth/eighth gear pair 16 and the engaged sixth gear selector K6, and then from the first output shaft 7 to the final reduction gear output shaft 18 via the output shaft gear pair 19. The sixth gear that provides a speed ratio smaller than that for the fifth gear is established by setting that the total gear ratio due to the sixth/eighth gear pair 15 and the gears (the first output shaft output gear 19a, the final reduction gear output shaft gear 19c) of the output shaft gear pair 19 is smaller than the total gear ratio due to the fifth gear pair 12 and the gears (the first output shaft output gear 19a, the final reduction gear output shaft gear 19c) of the output shaft gear pair 19. In the sixth forward gear, two tooth engagements or engaged gear pairs occur, i.e., one at the sixth/eighth gear pair 15, and the other at the output shaft gear pair 19. Thus, the number of tooth engagements or engaged gear pairs in the sixth forward gear is "two".

In this sixth forward gear, placing the hub sleeve S5 in the position to make a fixed rotational connection between the seventh gear 13b and the second output shaft 9 will put the transmission 1 in standby state for an upshift to the seventh gear. In this standby state, gradually disengaging the second clutch C2 and gradually engaging the first clutch C1 establishes the seventh forward gear.

Figure 10:
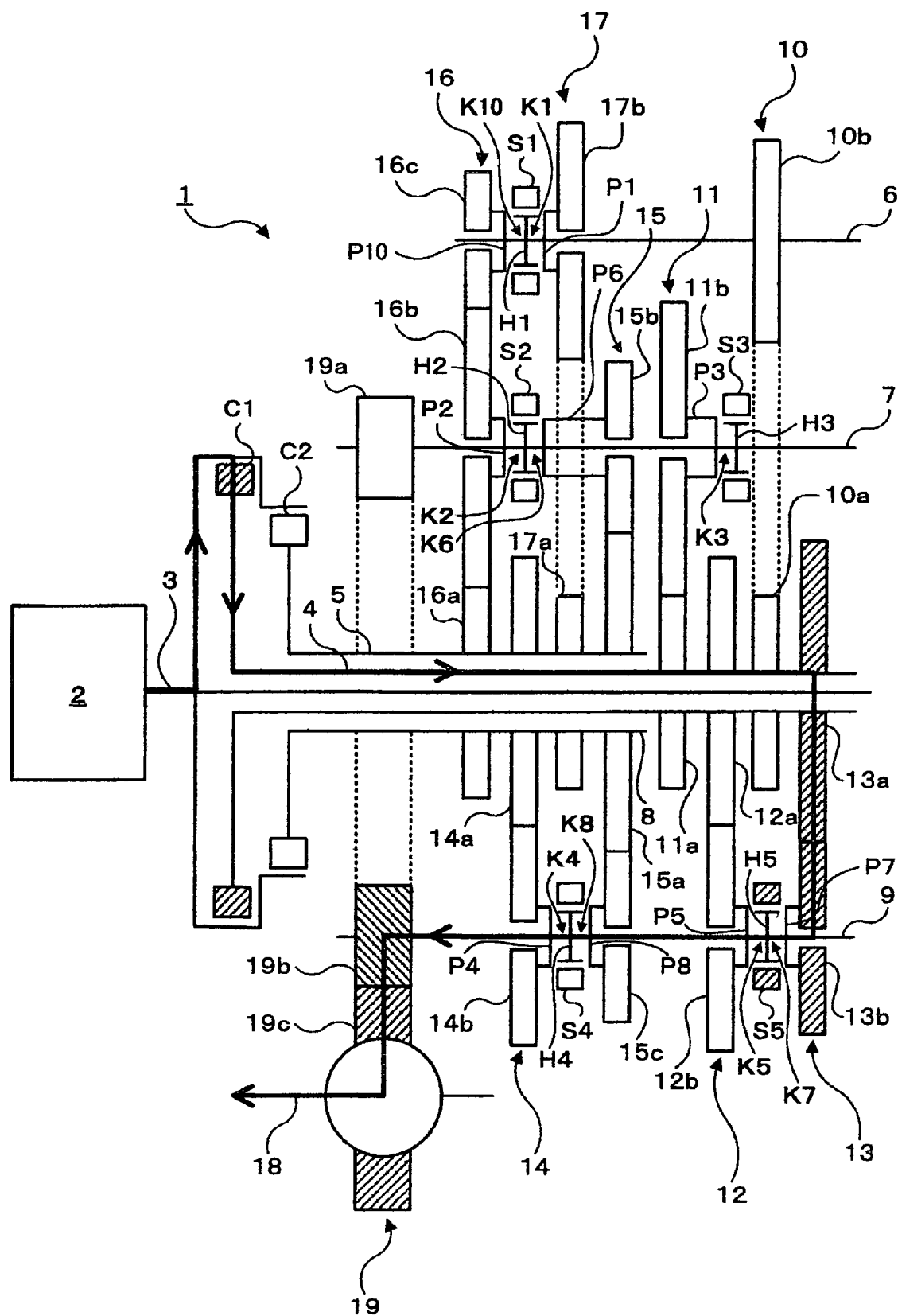
FIG. 10 is a simplified schematic view (skeleton diagram) of the vehicle transmission showing the seventh forward gear being established in accordance with the first embodiment of the present invention.

FIG. 10 shows the power (torque) path when the seventh gear is established in the first embodiment. As shown in this diagram, in the sixth forward gear, the engine torque that is transmitted by the engaged first clutch C1 to the first input shaft 4 is transmitted to the second output shaft 9 via the seventh gear pair 13 and the engaged seventh gear selector K7, and then from the second output shaft 9 to the final reduction gear output shaft 18 via the output shaft gear pair 19. The seventh gear that provides a speed ratio smaller than that for the sixth gear is established by setting that the total gear ratio due to the seventh gear pair 13 and the gears (the first output shaft output gear 19a, the final reduction gear output shaft gear 19c) of the output shaft gear pair 19 is smaller than the total gear ratio due to the sixth/eighth gear pair 15 and the gears (the first output shaft output gear 19a, the final reduction gear output shaft gear 19c) of the output shaft gear pair 19. In the seventh forward gear, two tooth engagements or engaged gear pairs occur, i.e., one at the seventh gear pair 13, and the other at the output shaft gear pair 19. Thus, the number of tooth engagements or engaged gear pairs in the seventh forward gear is "two".

In this seventh forward gear, placing the hub sleeve S4 in the position to make a fixed rotational connection between the eighth gear 15c and the second output shaft 9 will put the transmission 1 in standby state for an upshift to the eighth gear. In this standby state, gradually disengaging the first clutch C1 and gradually engaging the second clutch C1 establishes the eighth forward gear.

Figure 11:
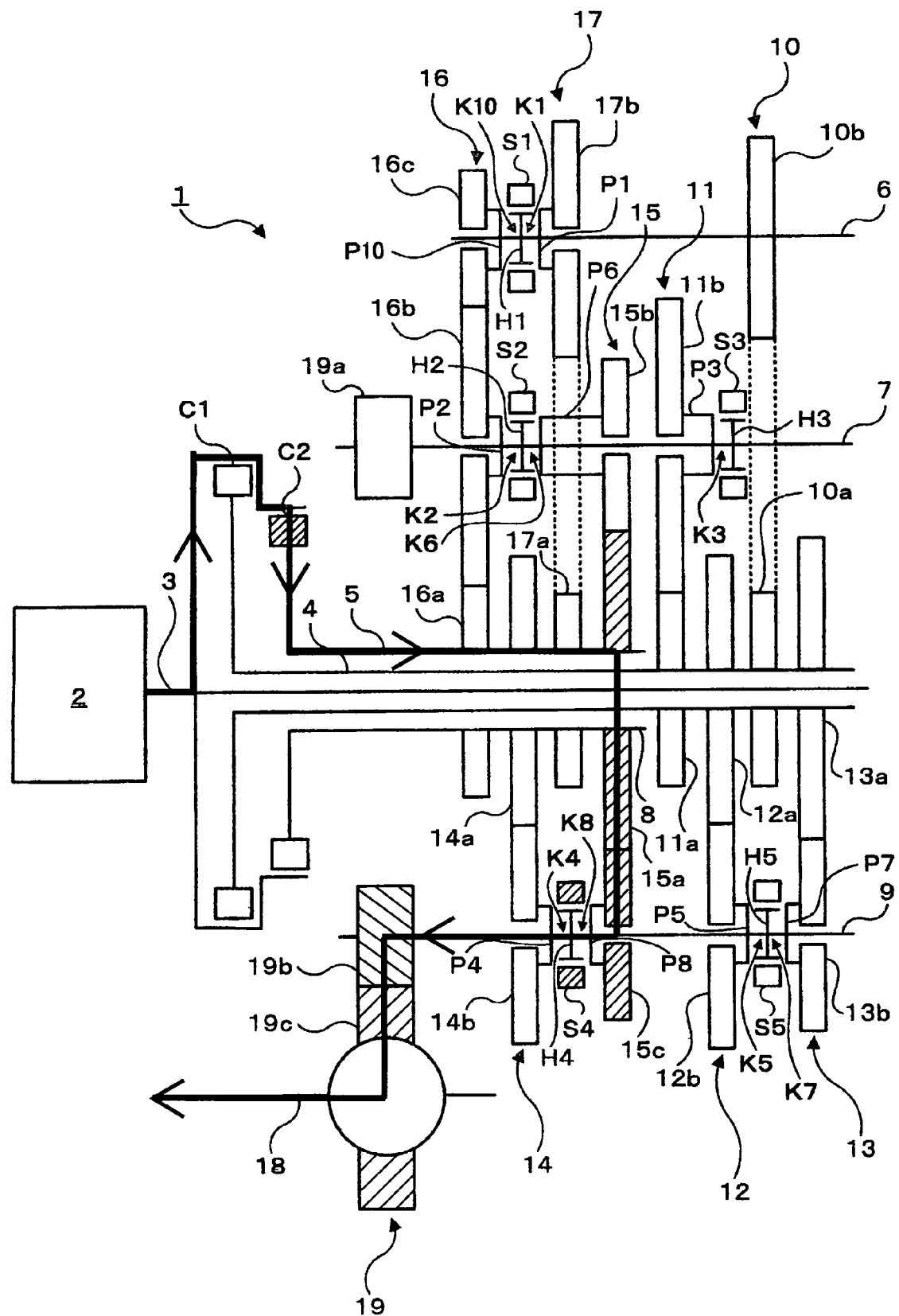
FIG. 11 is a simplified schematic view (skeleton diagram) of the vehicle transmission showing the eighth forward gear being established in accordance with the first embodiment of the present invention.

FIG. 11 shows the power (torque) path when the eighth gear is established in the first embodiment. As shown in this diagram, in the eighth forward gear, the engine torque that is transmitted by the engaged second clutch C2 to the second input shaft 5 is transmitted to the second output shaft 9 via the sixth/eighth gear pair 15 and the engaged eighth gear selector K8, and then from the second output shaft 9 to the final reduction gear output shaft 18 via the output shaft gear pair 19. The eighth that provides a speed ratio smaller than that for the seventh gear is established by setting that the total gear ratio due to the sixth/eighth gear pair 15 and the gears (the first output shaft output gear 19a, the final reduction gear output shaft gear 19c) of the output shaft gear pair 19 is smaller than the total gear ratio due to the seventh gear pair 13 and the gears (the first output shaft output gear 19a, the final reduction gear output shaft gear 19c) of the output shaft gear pair 19. In the eighth forward gear, two tooth engagements or engaged gear pairs occur, i.e., one at the sixth/eighth gear pair 15, and the other at the output shaft gear pair 19. Thus, the number of tooth engagements or engaged gear pairs in the eighth forward gear is "two". The reverse gear is established by engaging the first clutch C1 after making a fixed rotational connection between the reverse gear 16c and the first countershaft 6 by the hub sleeve S1 and making a fixed rotational connection between the first/second/reverse gear 16b and the first output shaft 7 by the hub sleeve S2.

Figure 12:
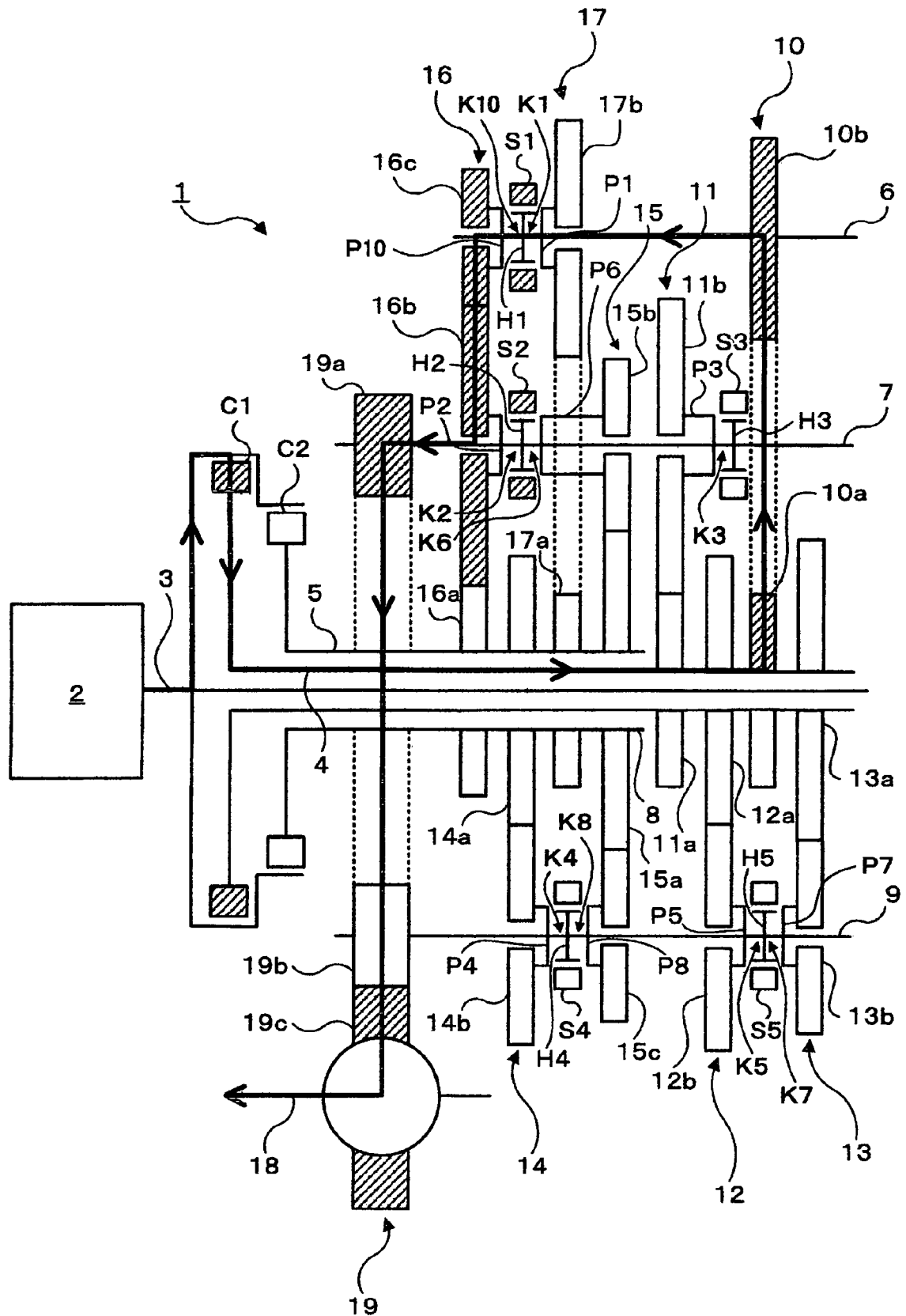
FIG. 12 is a simplified schematic view (skeleton diagram) of the vehicle transmission showing the reverse gear being established in accordance with the first embodiment of the present invention.

FIG. 12 shows the power (torque) path when the reverse gear is established in the first embodiment. As shown in this diagram, in the reverse gear, the engine torque transmitted via the engaged first clutch C1 is transmitted from the first input shaft 4 to the first countershaft 6 via the first/reverse gear pair 10, next, from the first countershaft 6 to the first output shaft 7 via the engaged reverse gear selector K10, the first/second/reverse gear pair 16, and the second gear selector K2. Furthermore, it is transmitted from the first output shaft 7 to the final reduction gear output shaft 18 via the output shaft gear pair 19. The reverse gear that provides a large speed ratio is established because each of the three gear pairs (the first/reverse gear pair 10, the first/second/reverse gear pair 16, the output shaft gear pair 19) functions to reduce speed in the torque path. In the reverse gear, three tooth engagements or engaged gear pairs occur, i.e., one at the first/reverse gear pair 10, other at the first/second/reverse gear pair 16, and the other at the output shaft gear pair 19. Thus, the number of tooth engagements or engaged gear pairs in the reverse gear is "three".

As above, the number of tooth engagements or engaged gear pairs of the transmission 1 according to the first embodiment is "4" for the first gear, "2" for each of the second to eighth gears, and "3" for the reverse gear. On this account, for the following reasons, it is possible, with the transmission 1 according to the first embodiment, to aim at miniaturization of a transmission, improvement of transmission efficiency, and restraint of noise.

At first, in order to miniaturize a transmission, it is effective to make a diameter of each of gears to incorporate into the transmission small. Among other things, a gear pair for the first gear that requires a large speed ratio should be made small, but, when the number of tooth engagement in the first gear is the smallest number of "1", though a large speed ratio can be achieved, upsizing of gears cannot be avoided with the result that a transmission cannot be miniaturized.

If, in the first gear, the number of tooth engagements is a more than "1", it is possible to achieve a large speed ratio and miniaturization of a transmission together. This is because, when the number of tooth engagements in the first gear assumes "4" as is so in the first embodiment, for example, the intermeshing gears (the first/reverse gear pair 10, the first gear pair 17, the first/second/reverse gear pair 16, and the output shaft gear pair 19) can share the speed ratio required for the first gear, and the sharing of the speed ratio allows you to design a desired speed ratio freely with each gear kept small in size with the result that it is possible to miniaturize a transmission after all.

By the way, although deterioration of transmission efficiency in each of the first and reverse gear, and an increase of gear intermeshing noise are worried when the number of tooth engagements is "4" in the first gear, and the number of tooth engagements is "3" in the reverse gear, comparing such inconveniences (deterioration of transmission efficiency and increase of gear intermeshing noise) with the above-mentioned effect (miniaturization of a transmission) reveals that a merit of the latter effect is absolutely big because the first gear and the reverse gear are rarely used. On this account it is realistic to assume the number of tooth engagements in the first gear "4" and the number of tooth engagements in the reverse gear "3" in order to establish miniaturization of a transmission.

In other words, designing in a direction toward small size, low cost, and low weight provides a good transmission as a whole rather than designing in a direction toward improvement of transmission efficiency in the first gear and the reverse gear taking into consideration that deteriorated transmission efficiency in the first gear and the reverse gear has a small influence on fuel consumption of a vehicle because time to use such gears is very short when generally the present invention is applied to the vehicle.

In addition, in the present embodiment, the number of tooth engagements in each of the second gear to the eighth gear is "2". These driving speed ratios (the second gear to the eighth gear) are driving speed ratios (the driving speed ratios that are commonly used in normal run state) that are used for longer time than the first gear and the reverse gear are used. Viewing a transmission as it is installed on a vehicle, reducing the number of tooth engagements makes it possible to aim at improving enhancement of the power transmission efficiency and restraining noise during run.

In addition, because the number of tooth engagements in the present embodiment is "3" that is less than "4" in the before mentioned prior art, this difference makes it possible to anticipate an improvement in transmission efficiency and a restraint in noise as compared to the prior art, and also makes it possible to reduce the number of parts.

In addition, separately from the fact that the first clutch C1, second clutch C2, first input shaft 4, second input shaft 5, first output shaft 7, first countershaft 6, and second countershaft 8 provide the above-mentioned effects, preparing the second output shaft 9 makes it possible to get a great number of driving speed ratios without increasing length of the transmission so much.

Furthermore, the second countershaft 8, the first input shaft 4, and the second input shaft 5 are arranged for rotation about a common axis and extending along the axis with the result that a reduction in the number of shafts in an appearance can make the whole transmission compact.

In addition, in the present embodiment, the two clutch hubs H1 and H2 constitute a clutch in the transmission path for the first forward gear that provides the largest speed ratio among the low speed driving speed ratios and a clutch in the transmission path for the first reverse gear that provides the largest speed ratio among the reverse driving speed ratios. One of these clutches necessarily has a clutch size that cannot but grow big from the viewpoint of securing cooling surface area and thermal capacity in preparation for clutch slip and heat load growing increasingly under the most severe conditions when a vehicle starts to move, but constituting the two clutches by two clutch hubs H1 and H2, respectively, allows you to design, for example, only one of the clutches big and the other small thereby to make the whole transmission compact.

Furthermore, in the present embodiment, the second output shaft 9 has arranged thereon, as driving speed ratios, the fourth gear 14b, the fifth gear 12b, the seventh gear 13b, and the eighth gear 15c. Because these gears are output sides of high speed driving speed ratios, the number of teeth of each of the gears is small and the diameter of each of the gears is short. As a result, it is no longer necessary to arrange a transmission bottom side that lies downward the second output shaft 9 greatly downward the engine axis. In recent years, increasing number of examples which separate engine vibration from a vehicle body by installing a part called a sub-member on a vehicle body and installing an engine on the sub-member. The present embodiment is effective in particular when such a sub-member is put below a transmission and it is not allowed to put a transmission bottom side of the transmission downwardly in a thoughtless manner.

In addition, the first/reverse gear pair 10 is a gear pair that is used for the first forward gear and the reverse gear. This first/reverse gear pair 10 has the same direction of power transmission (the first input shaft 4 to first/reverse gear pair 10 to first countershaft 6—see., FIGS. 4 and 12) in the first forward gear and reverse gear so that, when the reduction ratio of the first/reverse gear pair 10 is "r" in the first gear, the reduction ratio is "r" in the reverse gear with the result that it does not cause an increase in speed in the reverse gear. When setting a reduction ratio of each of the other gear pairs, it is no longer necessary to take such an increase in speed into account, making it possible to miniaturize gears of such other gear pairs, getting rid of limitation in a layout.

The preceding embodiment is not to be understood as a restriction of the present invention. Rather within the scope of technical thought of the invention, numerous modifications and developments are possible. For example, the invention may be implemented as follows:

Second Embodiment

Figure 13:
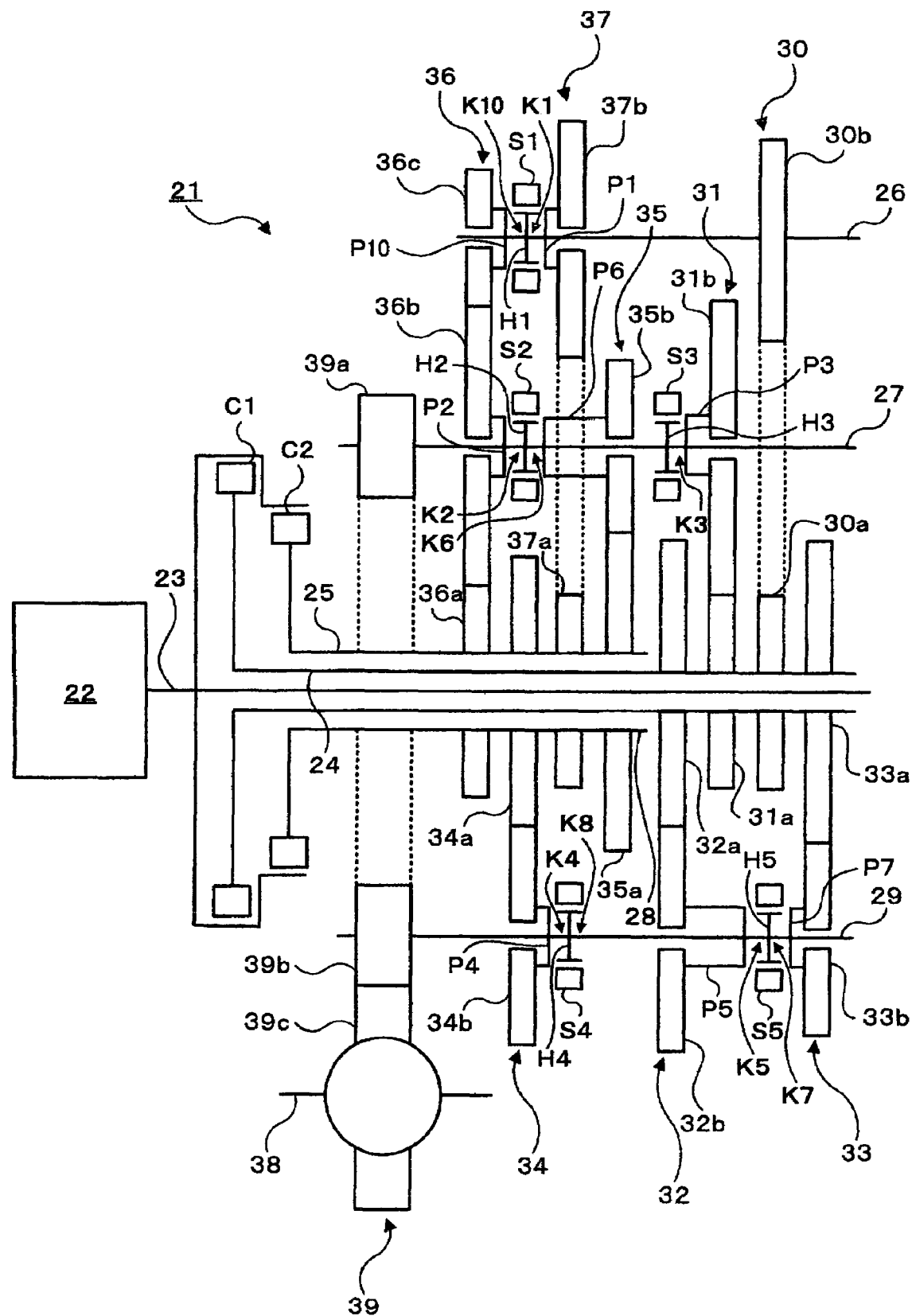
FIG. 13 is a simplified schematic view of a vehicle transmission in accordance with a second embodiment of the present invention.

Referring now to FIG. 13, a simplified schematic view of a vehicle transmission 21 is illustrated in accordance with a second embodiment. In view of the similarity between the first and second embodiments, selected parts of the second embodiment that are identical to the parts of the first embodiment will be given the same reference numerals as the parts of the first embodiment.

The vehicle transmission 21 is operatively coupled to an engine 22 that is a main power source by a main transmission shaft 23, a first input shaft 24 and a second input shaft 25. The first and second input shafts 24 and 25 are coaxial input shafts that are in coaxial relationship with the transmission shaft 23. Torque is selectively transmitted from the transmission shaft 23 to the first and second input shafts 24 and 25 by the first and second clutches C1 and C2, respectively. In particular, the first clutch C1 is disposed between the transmission shaft 23 and the first input shaft 24, while the second clutch C2 is disposed between the transmission shaft 23 and the second input shaft 25. Thus, the first clutch C1 provides or interrupts a torque transmission between the transmission shaft 23 and the first input shaft 24, while the second clutch C2 provides or interrupts a torque transmission between the transmission shaft 23 and the second input shaft 25. Preferably, each of the first and second clutches C1 and C2 is a frictional clutch, for example that is selectively controlled by a controller (not illustrated). The first and second clutches C1 and C2 can be shifted to any one of a fully closed state (i.e., engagement state) that provides a torque transmission, an open state (i.e., disengagement state) that does not provide a torque transmission and a slip state that is an intermediate state between them.

Furthermore, the transmission 21 further includes a first countershaft 26, a first output shaft 27, a second countershaft 28 and a second output shaft 29. These four shafts 26 to 29 are arranged in parallel relationship with the transmission shaft 23, the first input shaft 24 and the second input shaft 25. In addition, the second countershaft 28 and the second input shaft 25 are coupled together for rotation. These four shafts 26 to 29 are provided with a plurality of gear pairs for shifting between the various driving speed ratios. In particular, the transmission 21 further includes a first/reverse gear pair 30, a third gear pair 31, a fifth gear pair 32, a seventh gear pair 33, a fourth gear pair 34, a sixth gear pair 35, a first/second/reverse gear pair 36 and a first gear pair 37. A final reduction gear output shaft 38 is arranged in parallel relationship to the first and second output shafts 27 and 29 with an output shaft gear pair 39 arranged between the final reduction gear output shaft 38 and the first and second output shafts 27 and 29.

The first/reverse gear pair 30 is disposed between the first input shaft 24 and the first countershaft 26. This first/reverse gear pair 30 includes a first/reverse gear 30a installed on the first input shaft 24 for rotation as one body and a first/reverse gear 30b installed on the first countershaft 26 for rotation as one body. The first/reverse gears 30a and 30b mesh with each other in the first forward gear or first reverse gear to transmit torque from the first input shaft 24 to the first countershaft 26.

The third gear pair 31 is disposed between the first input shaft 24 and the first output shaft 27. This third gear pair 31 includes a third gear 31a installed on the first input shaft 24 for rotation as one body and a third gear 31b arranged coaxially with the first output shaft 27 for free rotation. The third gears 31a and 31b mesh with each other in the third forward gear to transmit torque from the first input shaft 24 to the first output shaft 27.

The fifth gear pair 32 is disposed between the first input shaft 24 and the second output shaft 29. This fifth gear pair 32 includes a fifth gear 32a installed on the first input shaft 24 for rotation as one body and a fifth gear 32b arranged coaxially with the second output shaft 29 for free rotation. The fifth gears 32a and 32b mesh with each other in the fifth forward gear to transmit torque from the first input shaft 24 to the second output shaft 29.

The seventh gear pair 33 is disposed between the first input shaft 24 and the second output shaft 29. This seventh gear pair 33 includes a seventh gear 33a installed on the first input shaft 24 for rotation as one body and a seventh gear 33b arranged coaxially with the second output shaft 29 for free rotation. The seventh gears 33a and 33b mesh with each other in the seventh forward gear to transmit torque from the first input shaft 24 to the second output shaft 29.

The fourth gear pair 34 is disposed between the second countershaft 28 and the second output shaft 29. This fourth gear pair 34 includes a fourth gear 34a installed on the second countershaft 28 for rotation as one body and a fourth gear 34b arranged coaxially with the second output shaft 29 for free rotation. The fourth gears 34a and 34b mesh with each other in the fourth forward gear to transmit torque from the second countershaft 38 to the second output shaft 29.

The sixth gear pair 35 is disposed between the second countershaft 28 and the first output shaft 27. This sixth gear pair 35 includes a sixth gear 35a installed on the second countershaft 28 for rotation as one body, and a sixth gear 35b arranged coaxially with the first output shaft 27 for free rotation. The sixth gears 35a and 35b mesh with each other in the sixth forward gear to transmit torque from the second countershaft 28 to the first output shaft 27.

The first/second/reverse gear pair 36 is disposed among the second countershaft 28, the first countershaft 26 and the first output shaft 27. This first/second/reverse gear pair 36 includes a first/second gear 36a installed on the second countershaft 28 for rotation as one body, a first/second/reverse gear 36b arranged coaxially with the first output shaft 27 for free rotation, and a reverse gear 36c arranged coaxially with the first countershaft 26 for free rotation. In the first and second forward gears, there is torque transmission between the first/second gear 36a and the first/second/reverse gear 36b. In the reverse gear, there is torque transmission between the first/second/reverse gear 36b and the reverse gear 36c.

The first gear pair 37 is disposed between the second countershaft 28 and the first countershaft 26. This first gear pair 37 includes a first gear 37a installed on the second countershaft 28 for rotation as one body and a first gear 37b arranged coaxially with the first countershaft 26 for free rotation. The first gears 37a and 37b mesh with each other in the first forward gear to transmit torque from the second countershaft 28 to the first countershaft 26.

The two freely rotatable gears (the reverse gear 36c and the first gear 37b) are arranged on the first countershaft 26 from the left of the drawing sequentially for free rotation, and two intermeshing clutch mechanisms or gear selectors K10 and K1 are arranged to selectively connect these gears to the first countershaft 26. In particular, the hub sleeve S1 is arranged between the reverse gear 36c and the first gear 37b in spline-connection with the clutch hub H1 that is fixedly connected to the first countershaft 26 as one body. The hub sleeve S1 can be pushed axially toward the reverse gear 36c into engagement with the spline P10, so that the hub sleeve S1 makes a rotationally fixed connection between the reverse gear 36c and the first countershaft 26. Accordingly, this arrangement constitutes the reverse gear selector K10. In contrast, when the hub sleeve S1 is pushed axially toward the first gear 37b into engagement with the spline P1, the hub sleeve S1 makes a rotationally fixed connection between the first gear 37b and the first countershaft 26. Accordingly, this arrangement constitutes the first gear selector K1.

Three freely rotatable gears (the first/second/reverse gear 36b, the sixth gear 35b and the third gear 31b) are arranged on the first output shaft 27 from the left of the drawing sequentially for free rotation, and three intermeshing clutch mechanisms or selectors K2, K6 and K3 are arranged to selectively connect these gears to the first output shaft 27. In particular, the hub sleeve S2 is arranged between the first/second/reverse gear 36b and the sixth gear 35b in spline-connection with the clutch hub H2 that is fixedly connected to the first output shaft 27 as one body. The hub sleeve S2 can be pushed axially toward the first/second/reverse gear 36b into engagement with the spline P2, so that the hub sleeve S2 makes a rotationally fixed connection between the first/second/reverse gear 36b and the first output shaft 27. Accordingly, this arrangement constitutes the second gear selector K2. In contrast, when the hub sleeve S2 is pushed axially toward the sixth gear 35b into engagement with the spline P6, the hub sleeve S2 makes a rotationally fixed connection between the sixth gear 35b and the first output shaft 27. Accordingly, this arrangement constitutes the sixth gear selector K6. In addition, the hub sleeve S3 is arranged on the left side, viewing in the drawing, of the third gear 31*b* in spline-connection with the clutch hub H3 that is fixedly connected to the first output shaft 27 as one body. The hub sleeve S3 can be pushed axially toward the third gear 31*b* into engagement with the spline P3, so that the hub sleeve S3 makes a rotationally fixed connection between the third gear 31*b* and the first output shaft 27. Accordingly, this arrangement constitutes the third gear selector K3.

Three freely rotatable gears (the fourth gear 34*b*, the fifth gear 32*b* and the seventh gear 33*b*) are arranged on the second output shaft 29 from the left of the drawing sequentially for free rotation, and three intermeshing clutch mechanisms or selectors K4, K5 and K7 are arranged to selectively connect these gears to the second output shaft 29. In particular, the hub sleeve S4 is arranged on the right side of the fourth gear 34*b* in spline-connection with the clutch hub H4 that is fixedly connected to the second output shaft 29 as one body. The hub sleeve S4 can be pushed axially toward the fourth gear 34*b* into engagement with the spline P4, so that the hub sleeve S4 makes a rotationally fixed connection between the fourth gear 34*b* and the second output shaft 29. Accordingly, this arrangement constitutes the fourth gear selector K4.

In addition, the hub sleeve S5 is arranged between the fifth gear 32*b* and the seventh gear 33*b* in spline-connection with the clutch hub H5 that is fixedly connected to the second output shaft 29 as one body. The hub sleeve S5 can be pushed axially toward the fifth gear 32*b* into engagement with the spline P5, so that the hub sleeve S5 makes a rotationally fixed connection between the fifth gear 32*b* and the second output shaft 29. Accordingly, this arrangement constitutes the fifth gear selector K5. In contrast, when the hub sleeve is pushed axially toward the seventh gear 33*b* into engagement with the spline P7, the above-mentioned hub sleeve S5 makes a rotationally fixed connection between the seventh gear 33*b* and the second output shaft 29. Accordingly, this arrangement constitutes the seventh gear selector K7.

The output shaft gear pair 39 is arranged on the first output shaft 27 and the second output shaft 29, and also on the final reduction gear output shaft 38 that is arranged in parallel relationship to these two shafts (the first output shaft 27 and the second output shaft 29). This output shaft gear pair 39 includes a first output shaft output gear 39*a* installed on the first output shaft 27 for rotation as one body, a second output shaft output gear 39*b* installed on the second output shaft 29 for rotation as one body, and a final reduction gear output shaft gear 39*c* arranged for the final reduction gear output shaft 38. In the first, second, third, and sixth forward gears and reverse gear, there is torque transmission from the first output shaft output gear 39*a* to the final reduction gear output shaft gear 39*c*, and in the fourth, fifth, seventh and eighth forward gears, there is torque transmission from the second output shaft output gear 39*b* to the final reduction gear output shaft gear 39*c*.

Here, the final reduction gear output shaft gear 39*c* has a greater number of teeth than the first and second output shaft output gears 39*a* and 39*b*. This arrangement cause a reduction in speed during torque transmission from the first output shaft output gear 39*a* to the final reduction gear output shaft gear 39*a* and during torque transmission from the second output shaft output gear 39*b* to the final reduction gear output shaft gear 30*c*.

The transmission 21 of the second embodiment that has such a constitution can set seven forward driving speed ratios and one reverse driving speed ratio. In such a constitution, in the first forward gear, the power transmission path runs via the first clutch C1 to the first input shaft 24 to the first/reverse gear pair 30 to the first countershaft 26 to the first gear pair 37 to the second countershaft 28 to the first/second/reverse gear pair 36 to the output shaft gear pair 39 to the final reduction gear output shaft 38. Thus, the number of tooth engagements or engaged gear pairs for torque transfer is "4", one at the first/reverse gear pair 30, another at the first gear pair 37, another at the first/second/reverse gear pair 36, and another at the output shaft gear pair 39.

In addition, in the second forward gear, the power transmission path runs via the second clutch C2 to the second input shaft 25 to the first/second/reverse gear pair 36 to the first output shaft 27 to the output shaft gear pair 39 to the final reduction gear output shaft 38. Thus, the number of tooth engagements or engaged gear pairs for torque transfer is "2", one at the first/second/reverse gear pair 36 and the other at the output shaft gear pair 39.

In addition, in the third forward gear, the power transmission path runs via the first clutch C1 to the first input shaft 24 to the third gear pair 31 to the first output shaft 27 to the output shaft gear pair 39 to the final reduction gear output shaft 38. Thus, the number of tooth engagements or engaged gear pairs for torque transfer is "2", one at the third gear pair 31 and the other at the output shaft gear pair 39.

In addition, in the fourth forward gear, the power transmission path runs via the second clutch C2 to the second input shaft 25 to the fourth gear pair 34 to the second output shaft 29 to the output shaft gear pair 39 to the final reduction gear output shaft 38. Thus, the number of tooth engagements or engaged gear pairs for torque transfer is "2", one at the fourth gear pair 34 and the other at the output shaft gear pair 39.

In addition, in the fifth forward gear, the power transmission path runs via the first clutch C1 to the first input shaft 24 to the fifth gear pair 32 to the second output shaft 29 to the output shaft gear pair 39 to the final reduction gear output shaft 38. Thus, the number of tooth engagements or engaged gear pairs for torque transfer is "2", one at the fifth gear pair 32 and the other at the output shaft gear pair 39.

In the sixth forward gear, the power transmission path runs via the second clutch C2 to second input shaft 25 to the sixth gear pair 35 to the first output shaft 27 to the output shaft gear pair 39 to the final reduction gear output shaft 38. Thus, the number of tooth engagements or engaged gear pairs for torque transfer is "2", one at the sixth gear pair 35 and the other at the output shaft gear pair 39.

In addition, in the seventh forward gear, the power transmission path runs via the first clutch C1 to the first input shaft 24 to the seventh gear pair 33 to the second output shaft 29 to the output shaft gear pair 39 to the final reduction gear output shaft 38. Thus, the number of tooth engagements or engaged gear pairs for torque transfer is "2", one at the seventh gear pair 33 and the other at the output shaft gear pair 39.

In addition, in the reverse gear, the power transmission path runs via the first clutch C1 to the first input shaft 24 to the first/reverse gear pair 30 to the first countershaft 26 to the first/second/reverse gear pair 36 to the output shaft gear pair 39 to the final reduction gear output shaft 38. Thus, the number of tooth engagements or engaged gear pairs for torque transfer is "3", one at the first/reverse gear pair 30, another at the first/second/reverse gear pair 36, and another at the output shaft gear pair 39.

As above, the number of tooth engagements or engaged gear pairs of the transmission 21 according to the second embodiment is "4" for the first gear, "2" for each of the second to seventh gears, and "3" for the reverse gear. On this account, similarly to the first embodiment, it is possible, with the transmission 21, to aim at miniaturization of a transmission, improvement of transmission efficiency, and restraint of noise.

In addition, there is provided a special effect that, among the forward driving speed ratios, a speed ratio of each of the third to seventh gears can be set independently and individually from speed ratios of the other gears because the third to seventh gears do not share any gear with the other gears.

In addition, the speed ratio of the second gear is set by a gear ratio between the first/second gear 36a and the first/second/reverse gear 36b, while a speed ratio of the first gear is set by three gear ratios, which are a gear ratio between the first/second gear 36a and the first/second/reverse gear 36b, a gear ratio between the first gear 37a and the first gear 37b, and a gear ratio between the first/reverse gear 30a and the first/reverse gear 30b.

Therefore, even if the speed ratio of the second gear is set by the gear ratio between the first/second gear 36a and the first/second/reverse gear 36b, it is possible to set the speed ratio of the first gear freely by setting the other two gear ratios, which are the gear ratio between the first gear 37a and the first gear 37b, and the gear ratio between the first/reverse gear 30a and the first/reverse gear 30b.

The foregoing description reveals that voluntarily setting a speed ratio of each of forward driving speed ratios from the first gear to the seventh gear is possible.

Third Embodiment

Figure 14:
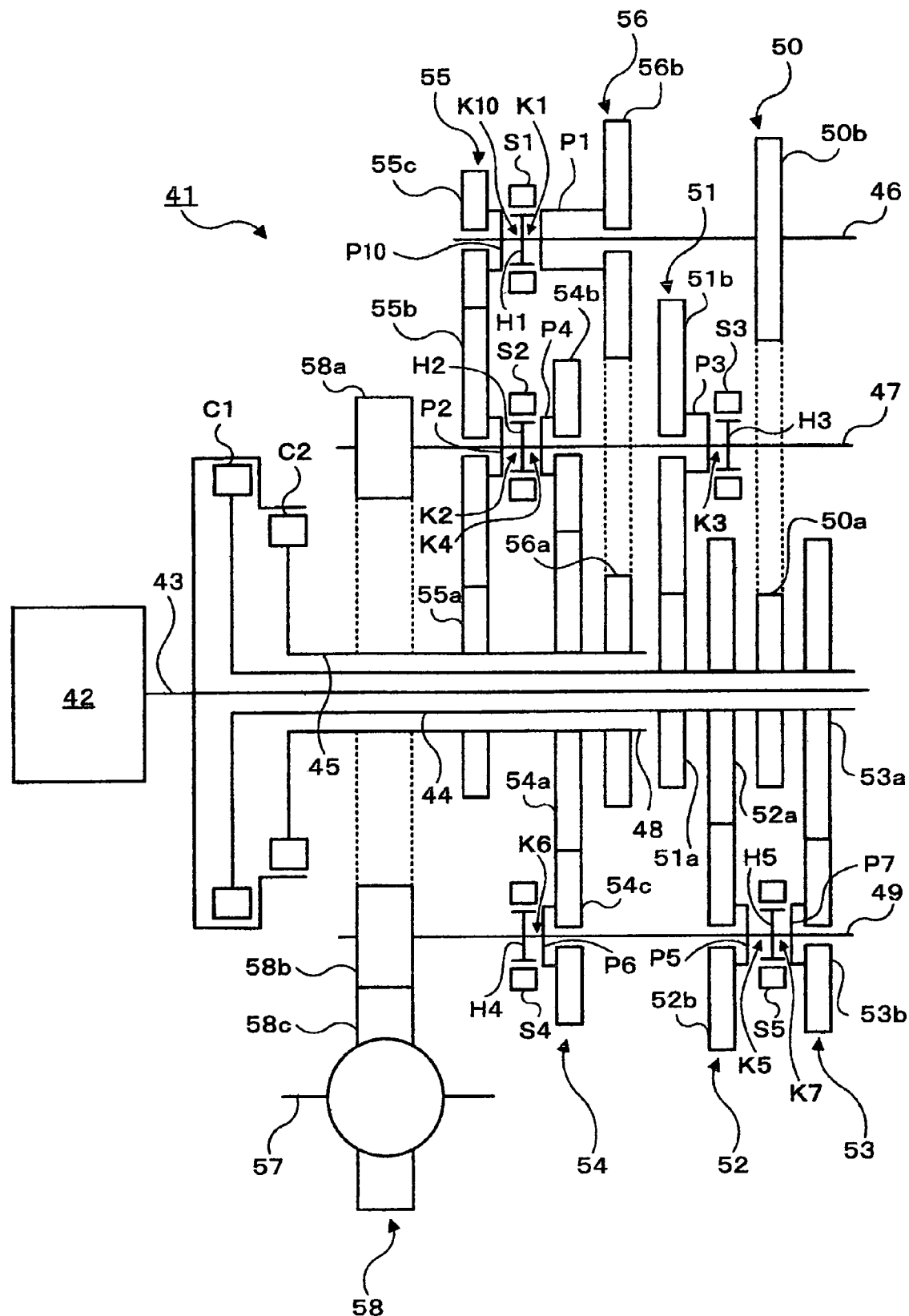
FIG. 14 is a simplified schematic view of a vehicle transmission in accordance with a third embodiment of the present invention.

Referring now to FIG. 14, a simplified schematic view of a vehicle transmission 41 is illustrated in accordance with a third embodiment. In view of the similarity between the third embodiment and the prior embodiments, selected parts of the third embodiment that are identical to the parts of the prior embodiments will be given the same reference numerals as the parts of the prior embodiments.

The vehicle transmission 41 is operatively coupled to an engine 42 that is a main power source by a main transmission shaft 43, a first input shaft 44 and a second input shaft 45. The first and second input shafts 44 and 45 are coaxial input shafts that are in coaxial relationship with the transmission shaft 43. Torque is selectively transmitted from the transmission shaft 43 to the first and second input shafts 44 and 45 by the first and second clutches C1 and C2, respectively. In particular, the first clutch C1 is disposed between the transmission shaft 43 and the first input shaft 44, while the second clutch C2 is disposed between the transmission shaft 43 and the second input shaft 45. Thus, the first clutch C1 provides or interrupts a torque transmission between the transmission shaft 43 and the first input shaft 44, while the second clutch C2 provides or interrupts a torque transmission between the transmission shaft 43 and the second input shaft 45. Preferably, each of the first and second clutches C1 and C2 is a frictional clutch, for example that is selectively controlled by a controller (not illustrated). The first and second clutches C1 and C2 can be shifted to any one of a fully closed state (i.e., engagement state) that provides a torque transmission, an open state (i.e., disengagement state) that does not provide a torque transmission and a slip state that is an intermediate state between them.

Furthermore, the transmission 41 further includes a first countershaft 46, a first output shaft 47, a second countershaft 48 and a second output shaft 49. These four shafts 46 to 49 are arranged in parallel relationship with the transmission shaft 43, the first input shaft 44 and the second input shaft 45. In addition, the second countershaft 48 and the second input shaft 45 are coupled together for rotation. These four shafts 46 to 49 are provided with a plurality of gear pairs for shifting between the various driving speed ratios. In particular, the transmission 41 further includes a first/reverse gear pair 50, a third gear pair 51, a fifth gear pair 52, a seventh gear pair 53, a fourth/sixth gear pair 54, a first/second/reverse gear pair 55 and a first gear pair 56. A final reduction gear output shaft 57 is arranged in parallel relationship to the first and second output shafts 47 and 49 with an output shaft gear pair 58 arranged between the final reduction gear output shaft 57 and the first and second output shafts 47 and 49.

The first/reverse gear pair 50 is disposed between the first input shaft 44 and the first countershaft 46. This first/reverse gear pair 50 includes a first/reverse gear 50a installed on the first input shaft 44 for rotation as one body and a first/reverse gear 50b installed on the first countershaft 46 for rotation as one body. The first/reverse gears 50a and 50b mesh with each other in the first forward gear or first reverse gear to transmit torque from the first input shaft 44 to the first countershaft 46.

The third gear pair 51 is disposed between the first input shaft 44 and the first output shaft 47. This third gear pair 51 includes a third gear 51a installed on the first input shaft 44 for rotation as one body and a third gear 51b arranged coaxially with the first output shaft 47 for free rotation. The third gears 51a and 51b mesh with each other in the third forward gear to transmit torque from the first input shaft 44 to the first output shaft 47.

The fifth gear pair 52 is disposed between the first input shaft 44 and the second output shaft 49. This fifth gear pair 52 includes a fifth gear 52a installed on the first input shaft 44 for rotation as one body and a fifth gear 52b arranged coaxially with the second output shaft 49 for free rotation. The fifth gears 52a and 52b mesh with each other in the fifth forward gear to transmit torque from the first input shaft 44 to the second output shaft 49.

The seventh gear pair 53 is disposed between the first input shaft 44 and the second output shaft 49. This seventh gear pair 53 includes a seventh gear 53a installed on the first input shaft 44 for rotation as one body and a seventh gear 53b arranged coaxially with the second output shaft 49 for free rotation. The seventh gears 53a and 53b mesh with each other in the seventh forward gear to transmit torque from the first input shaft 44 to the second output shaft 49.

The fourth/sixth gear pair 54 is disposed among the second countershaft 48, the first output shaft 47, and the second output shaft 49. This fourth/sixth gear pair 54 includes a fourth/sixth gear 54a installed on the second countershaft 48 for rotation as one body, a fourth gear 54b arranged coaxially with the first output shaft 47 for free rotation, and a sixth gear 54c arranged coaxially with the second output shaft 49 for free rotation. In the fourth gear, there is torque transmission between the fourth/sixth gear 54a and the fourth gear 54b. In the sixth gear, there is torque transmission between the fourth/sixth gear 54a and the sixth gear 54c.

The first/second/reverse gear pair 55 is disposed among the second countershaft 48, the first countershaft 46 and the first output shaft 47. This first/second/reverse gear pair 55 includes a first/second gear 55a installed on the second countershaft 48 for rotation as one body, a first/second/reverse gear 55b arranged coaxially with the first output shaft 47 for free rotation, and a reverse gear 55c arranged coaxially with the first countershaft 46 for free rotation. In the first and second forward gears, there is torque transmission between the first/second gear 55a and the first/second/reverse gear 55b. In the reverse gear, there is torque transmission between the first/second/reverse gear 55b and the reverse gear 55c.

The first gear pair 56 is disposed between the second countershaft 48 and the first countershaft 46. This first gear pair 56 includes a first gear 56a installed on the second countershaft 48 for rotation as one body and a first gear 56b arranged coaxially with the first countershaft 46 for free rotation. The first gears 56a and 56b mesh with each other in the first forward gear to transmit torque from the second countershaft 48 to the first countershaft 46.

The two freely rotatable gears (the reverse gear 55c and the first gear 56b) are arranged on the first countershaft 46 from the left of the drawing sequentially for free rotation, and two intermeshing clutch mechanisms or gear selectors (K10, K1) are arranged to selectively connect these gears to the first countershaft 46.

In particular, the hub sleeve S1 is arranged between the reverse gear 55c and first gear 56b in spline-connection with the clutch hub H1 that is fixedly connected to the first countershaft 46 as one body. The hub sleeve S1 can be pushed axially toward the reverse gear 55c into engagement with the spline P10, so that the hub sleeve S1 makes a rotationally fixed connection between the reverse gear 55c and the first countershaft 46. Accordingly, this arrangement constitutes the reverse gear selector K10. In contrast, when the hub sleeve S1 is pushed axially toward the first gear 56b into engagement with the spline P1, the hub sleeve S1 makes a rotationally fixed connection between the first gear 56b and the first countershaft 46. Accordingly, this arrangement constitutes the first gear selector K1.

Three freely rotatable gears (the first/second/reverse gear 55b, the fourth gear 54b, and the third gear 51b) are arranged on the first output shaft 47 from the left of the drawing sequentially for free rotation, and three intermeshing clutch mechanisms or selectors (K2, K4, K3) are arranged to selectively connect these gears to the first output shaft 47.

In particular, the hub sleeve S2 is arranged between the first/second/reverse gear 55b and the fourth gear 54b in spline-connection with the clutch hub H2 that is fixedly connected to the first output shaft 47 as one body. The hub sleeve S2 can be pushed axially toward the first/second/reverse gear 55b into engagement with the spline P2, so that the hub sleeve S2 makes a rotationally fixed connection between the first/second/reverse gear 55b and the first output shaft 47. Accordingly, this arrangement constitutes the second gear selector K2. In contrast, when the hub sleeve S2 is pushed axially toward the fourth gear 54b into engagement with the spline P4, the hub sleeve S2 makes a rotationally fixed connection between the fourth gear 54b and the first output shaft 47. Accordingly, this arrangement constitutes the fourth gear selector K4.

In addition, the hub sleeve S3 is arranged on the right side, viewing in the drawing, of the third gear 51b in spline-connection with the clutch hub H3 that is fixedly connected to the first output shaft 47 as one body. The hub sleeve S3 can be pushed axially toward the third gear 51b into engagement with the spline P3, so that the hub sleeve S3 makes a rotationally fixed connection between the third gear 51b and the first output shaft 47. Accordingly, this arrangement constitutes the third gear selector K3.

Three freely rotatable gears (the sixth gear 54c, the fifth gear 52b and the seventh gear 53b) are arranged on the second output shaft 49 from the left of the drawing sequentially for free rotation, and three intermeshing clutch mechanisms or selectors (K6, K5, K7) are arranged to selectively connect these gears to the second output shaft 49. In particular, the hub sleeve S4 is arranged on the left side of the sixth gear 54c in spline-connection with the clutch hub H4 that is fixedly connected to the second output shaft 49 as one body. The hub sleeve S4 can be pushed axially toward the sixth gear 54c into engagement with the spline P6, so that the hub sleeve S4 makes a rotationally fixed connection between the sixth gear 54c and the second output shaft 49. Accordingly, this arrangement constitutes the sixth gear selector K6. In addition, the hub sleeve S5 is arranged between the fifth gear 52b and the seventh gear 53b in spline-connection with the clutch hub H5 that is fixedly connected to the second output shaft 49 as one body. The hub sleeve S5 can be pushed axially toward the fifth gear 52b into engagement with the spline P5, so that the hub sleeve S5 makes a rotationally fixed connection between the fifth gear 52b and the second output shaft 49. Accordingly, this arrangement constitutes the fifth gear selector K5. In contrast, when the hub sleeve S5 is pushed axially toward the seventh gear 53b into engagement with the spline P7, the hub sleeve S5 makes a rotationally fixed connection between the seventh gear 53b and the second output shaft 49. Accordingly, this arrangement constitutes the seventh gear selector K7.

The output shaft gear pair 58 is arranged on the first output shaft 47 and the second output shaft 49, and also on the final reduction gear output shaft 57 that is arranged in parallel relationship to these two shafts (the first output shaft 47 and the second output shaft 49). This output shaft gear pair 58 includes a first output shaft output gear 58a installed on the first output shaft 47 for rotation as one body, a second output shaft output gear 58b installed on the second output shaft 49 for rotation as one body, and a final reduction gear output shaft gear 58c arranged for the final reduction gear output shaft 57.

The transmission 41 of the third embodiment that has such a constitution can set seven forward driving speed ratios and one reverse driving speed ratio. In such a constitution, in the first forward gear, the power transmission path runs via the first clutch C1 to the first input shaft 44 to the first/reverse gear pair 50 to the first countershaft 46 to the first gear pair 56 to the second countershaft 48 to the first/second/reverse gear pair 55 to first output shaft 47 to the output shaft gear pair 58 to the final reduction gear output shaft 57. Thus, the number of tooth engagements or engaged gear pairs for torque transfer is "4", one at the first/reverse gear pair 50, another at the first gear pair 56, another at the first/second/reverse gear pair 55, and another at the output shaft gear pair 58.

In addition, in the second forward gear, the power transmission path runs via the second clutch C2 to the second input shaft 45 to the first/second/reverse gear pair 55 to the first output shaft 47 to the output shaft gear pair 58 to the final reduction gear output shaft 57. Thus, the number of tooth engagements or engaged gear pairs for torque transfer is "2", one at the first/second/reverse gear pair 56 and the other at the output shaft gear pair 58.

In addition, in the third forward gear, the power transmission path runs via the first clutch C1 to the first input shaft 44 to the third gear pair 51 to the first output shaft 47 to the output shaft gear pair 58 to the final reduction gear output shaft 57. Thus, the number of tooth engagements or engaged gear pairs for torque transfer is "2", one at the third gear pair 51 and the other at the output shaft gear pair 58.

In addition, in the fourth forward gear, the power transmission path runs via the second clutch C2 to the second input shaft 45 to the fourth/sixth gear pair 54 to the first output shaft 47 to the output shaft gear pair 58 to the final reduction gear output shaft 57. Thus, the number of tooth engagements or engaged gear pairs for torque transfer is "2", one at the fourth/sixth gear pair 54 and the other at the output shaft gear pair 58.

In addition, in the fifth forward gear, the power transmission path runs via the first clutch C1 to the first input shaft 44 to the fifth gear pair 52 to the second output shaft 49 to the output shaft gear pair 58 to the final reduction gear output shaft 57. Thus, the number of tooth engagements or engaged gear pairs for torque transfer is "2", one at the fifth gear pair 52 and the other at the output shaft gear pair 58.

In addition, in the sixth forward gear, the power transmission path runs via the second clutch C2 to the second input shaft 45 to the fourth/sixth gear pair 54 to the second output shaft 49 to the output shaft gear pair 58 to the final reduction gear output shaft 57. Thus, the number of tooth engagements or engaged gear pairs for torque transfer is "2", one at the fourth/sixth gear pair 54 and the other at the output shaft gear pair 58.

In addition, in the seventh forward gear, the power transmission path runs via the first clutch C1 to the first input shaft 44 to the seventh gear pair 53 to the second output shaft 49 to the output shaft gear pair 58 to the final reduction gear output shaft 57. Thus, the number of tooth engagements or engaged gear pairs for torque transfer is "2", one at the seventh gear pair 53 and the other at the output shaft gear pair 58.

In addition, in the reverse gear, the power transmission path runs via the first clutch C1 to the first input shaft 44 to the first/reverse gear pair 50 to the first countershaft 46 to the first/second/reverse gear pair 55 to the first output shaft 47 to the output shaft gear pair 58 to the final reduction gear output shaft 57. Thus, the number of tooth engagements or engaged gear pairs for torque transfer is "3", one at the first/reverse gear pair 50, another at the first/second/reverse gear pair 55, and the other at the output shaft gear pair 58.

As above, the number of tooth engagements or engaged gear pairs of the transmission 41 according to the third embodiment is "4" for the first gear, "2" for each of the second to seventh gears, and "3" for the reverse gear. On this account, similarly to the first embodiment, it is possible, with the transmission 41, to aim at miniaturization of a transmission, improvement of transmission efficiency, and restraint of noise.

In addition, in this third embodiment, three gears, the fifth gear 52b, sixth gear 54c, and seventh gear 53b, are arranged on the second output shaft 49, which is located downwardly, for free rotation.

Since the gears for the fifth gear and higher gears are arranged, it is no longer necessary to arrange a transmission bottom side that lies downward the second output shaft 49 greatly downward the engine axis. Recent years see increasing number of examples which separate engine vibration from a vehicle body by installing a part called a sub-member on a vehicle body and installing an engine on the sub-member. The present embodiment is effective when such a sub-member is put below a transmission and it is not allowed to put a transmission bottom side of the transmission downwardly in a thoughtless manner.

This effect is the same as the effect provided by the first embodiment, but the effect of the present embodiment is remarkable because this third embodiment arrange gears for the fifth gear and higher as compared to the first embodiment that arranges gears for the fourth gear and higher.

Fourth Embodiment

Figure 15:
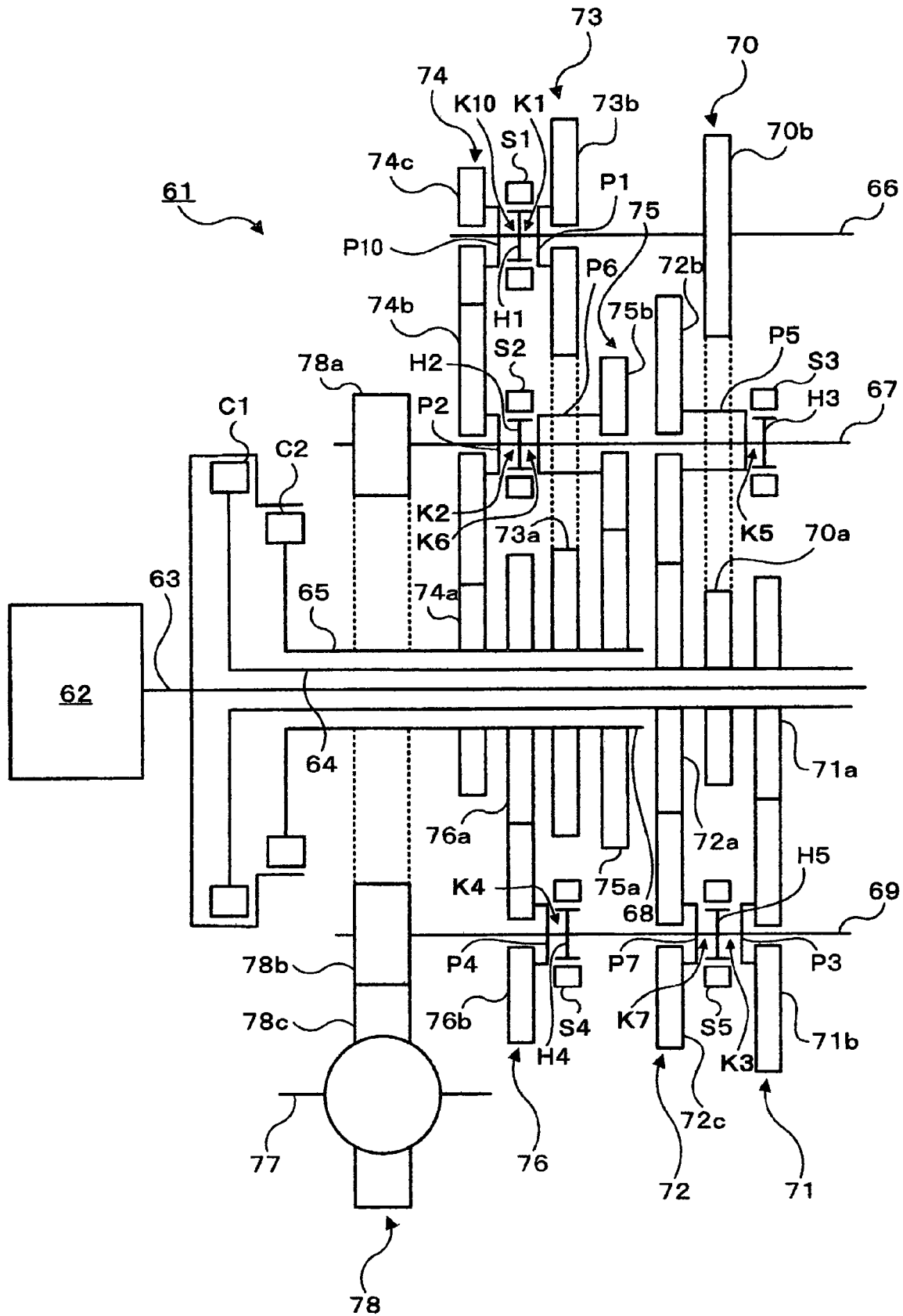
FIG. 15 is a simplified schematic view of a vehicle transmission in accordance with a fourth embodiment of the present invention.

Referring now to FIG. 15, a simplified schematic view of a vehicle transmission 61 is illustrated in accordance with a fourth embodiment. In view of the similarity between the fourth embodiment and the prior embodiments, selected parts of the fourth embodiment that are identical to the parts of the prior embodiments will be given the same reference numerals as the parts of the prior embodiments.

The vehicle transmission 61 is operatively coupled to an engine 62 that is a main power source by a main transmission shaft 63, a first input shaft 64 and a second input shaft 65. The first and second input shafts 64 and 65 are coaxial input shafts that are in coaxial relationship with the transmission shaft 63. Torque is selectively transmitted from the transmission shaft 63 to the first and second input shafts 64 and 65 by the first and second clutches C1 and C2, respectively. In particular, the first clutch C1 is disposed between the transmission shaft 63 and the first input shaft 64, while the second clutch C2 is disposed between the transmission shaft 63 and the second input shaft 65. Thus, the first clutch C1 provides or interrupts a torque transmission between the transmission shaft 63 and the first input shaft 64, while the second clutch C2 provides or interrupts a torque transmission between the transmission shaft 63 and the second input shaft 65. Preferably, each of the first and second clutches C1 and C2 is a frictional clutch, for example that is selectively controlled by a controller (not illustrated). The first and second clutches C1 and C2 can be shifted to any one of a fully closed state (i.e., engagement state) that provides a torque transmission, an open state (i.e., disengagement state) that does not provide a torque transmission and a slip state that is an intermediate state between them.

Furthermore, the transmission 61 further includes a first countershaft 66, a first output shaft 67, a second countershaft 68 and a second output shaft 69. These four shafts 66 to 69 are arranged in parallel relationship with the transmission shaft 63, the first input shaft 64 and the second input shaft 65. In addition, the second countershaft 68 and the second input shaft 65 are coupled together for rotation. These four shafts 66 to 69 are provided with a plurality of gear pairs for shifting between the various driving speed ratios. In particular, the transmission 61 further includes a first/reverse gear pair 70, a third gear pair 71, a fifth/seventh gear pair 72, a first gear pair 73, a first/second/reverse gear pair 74, a sixth gear pair 75, and a fourth gear pair 76. A final reduction gear output shaft 77 is arranged in parallel relationship to the first and second output shafts 67 and 69 with an output shaft gear pair 78 arranged between the final reduction gear output shaft 77 and the first and second output shafts 67 and 69.

The first/reverse gear pair 70 is disposed between the first input shaft 64 and the first countershaft 66. This first/reverse gear pair 70 includes a first/reverse gear 70a installed on the first input shaft 64 for rotation as one body and a first/reverse gear 70b installed on the first countershaft 66 for rotation as one body. The first/reverse gears 70a and 70b mesh with each other in the first forward gear and the first reverse gear to transmit torque from the first input shaft 64 to the first countershaft 66.

The third gear pair 71 is disposed between the first input shaft 64 and the first output shaft 67. This third gear pair 71 includes a third gear 71a installed on the first input shaft 64 for rotation as one body and a third gear 71b arranged coaxially with the first output shaft 67 for free rotation. The third gears 71a and 71b mesh with each other in the third forward gear to transmit torque from the first input shaft 64 to the first output shaft 67.

The fifth/seventh gear pair 72 is disposed among the first input shaft 64, the first output shaft 67, and the second output shaft 69. This fifth/seventh gear pair 72 includes a fifth/seventh gear 72a installed on the first input shaft 64 for rotation as one body, a fifth gear 72b arranged coaxially with the first output shaft 67 for free rotation, and a seventh gear 72c arranged coaxially with the second output shaft 69 for free rotation. In the fifth gear, there is torque transmission between the fifth/seventh gear 72a and the fifth gear 72b. In the seventh gear, there is torque transmission between the fifth/seventh gear 72a and the seventh gear 72c.

The first gear pair 73 is disposed between the first countershaft 66 and the second countershaft 68. This first gear pair 73 includes a first gear 73a installed on the second countershaft 68 for rotation as one body and a first gear 73b arranged coaxially with the first countershaft 66 for free rotation for torque transmission in the first forward gear.

The first/second/reverse gear pair 74 is disposed among the second countershaft 68, the first output shaft 67, and the first countershaft 66. This first/second/reverse gear pair 74 includes a first/second gear 74a installed on the second countershaft 68 for rotation as one body, a first/second/reverse gear 74b arranged coaxially with the first output shaft 67 for free rotation, and a reverse gear 55c arranged coaxially with the first countershaft 66 for free rotation. In the first and second forward gears, there is torque transmission between the first/second gear 74a and the first/second/reverse gear 74b. In the reverse gear, there is torque transmission between the first/second/reverse gear 74b and the reverse gear 74c.

The sixth gear pair 75 is disposed between the second countershaft 68 and the first output shaft 67. This sixth gear pair 75 includes a sixth gear 75a installed on the second countershaft 68 for rotation as one body and a sixth gear 75b coaxially arranged on the first output shaft 67 for free rotation for torque transmission in the sixth forward gear.

Furthermore, the fourth gear pair 76 is disposed between the second countershaft 68 and the second output shaft 69. This fourth gear pair 76 includes a fourth gear 76a installed on the second countershaft 68 for rotation as one body, and a fourth gear 76b coaxially arranged on the second output shaft 69 for free rotation for torque transmission in the fourth forward gear.

The two freely rotatable gears (the reverse gear 74c and the first gear 73b) are arranged on the first countershaft 66 from the left of the drawing sequentially for free rotation, and two intermeshing clutch mechanisms or selectors (K10, K1) are arranged to selectively connect these gears to the first countershaft 66.

In particular, the hub sleeve S1 is arranged between the reverse gear 74c and first gear 73b in spline-connection with the clutch hub H1 that is fixedly connected to the first countershaft 66 as one body. The hub sleeve S1 can be pushed axially toward the reverse gear 74c into engagement with the spline P10, so that the hub sleeve S1 makes a rotationally fixed connection between the reverse gear 74c and the first countershaft 66. Accordingly, this arrangement constitutes the reverse gear selector K10. In contrast, when the hub sleeve S1 is pushed axially toward the first gear 73b into engagement with the spline P1, the hub sleeve S1 makes a rotationally fixed connection between the first gear 73b and the first countershaft 66. Accordingly, this arrangement constitutes the first gear selector K1.

Three freely rotatable gears, which are the first/second/reverse gear 74b, the sixth gear 75b, and the fifth gear 72b) are arranged on the first output shaft 67 from the left of the drawing sequentially for free rotation, and three intermeshing clutch mechanisms or selectors (K2, K6, K5) are arranged to selectively connect these gears to the first output shaft 67. In particular, the hub sleeve S2 is arranged between the first/second/reverse gear 74b and the sixth gear 75b in spline-connection with the clutch hub H2 that is fixedly connected to the first output shaft 67 as one body. The hub sleeve S2 can be pushed axially toward the first/second/reverse gear 74b into engagement with the spline P2, so that the hub sleeve S2 makes a rotationally fixed connection between the first/second/reverse gear 74b and the first output shaft 67. Accordingly, this arrangement constitutes the second gear selector K2. In contrast, when the hub sleeve S2 is pushed axially toward the sixth gear 75b into engagement with the spline P6, the hub sleeve S2 makes a rotationally fixed connection between the sixth gear 75b and the first output shaft 67. Accordingly, this arrangement constitutes the sixth gear selector K6.

In addition, the hub sleeve S3 is arranged on the right side, viewing in the drawing, of the fifth gear 72b in spline-connection with the clutch hub H3 that is fixedly connected to the first output shaft 67 as one body. The hub sleeve S3 can be pushed axially toward the fifth gear 72b into engagement with the spline P5, so that the hub sleeve S3 makes a rotationally fixed connection between the fifth gear 72b and the first output shaft 67. Accordingly, this arrangement constitutes the fifth gear selector K5.

Three freely rotatable gears (the fourth gear 76b, the seventh gear 72c and the third gear 71b) are arranged on the second output shaft 59 from the left of the drawing sequentially for free rotation, and three intermeshing clutch mechanisms or selectors (K4, K7, K3) are arranged to selectively connect these gears to the second output shaft 69.

In particular, the hub sleeve S4 is arranged on the right side of the fourth gear 76b in spline-connection with the clutch hub H4 that is fixedly connected to the second output shaft 69 as one body. The hub sleeve S4 can be pushed axially toward the fourth gear 76b into engagement with the spline P4, so that the hub sleeve S4 makes a rotationally fixed connection between the fourth gear 76b and the second output shaft 69. Accordingly, this arrangement constitutes the fourth gear selector K4.

In addition, the hub sleeve S5 is arranged between the seventh gear 72c and the third gear 71b in spline-connection with the clutch hub H5 that is fixedly connected to the second output shaft 69 as one body. The hub sleeve S5 can be pushed axially toward the seventh gear 72c into engagement with the spline P7, so that the hub sleeve S5 makes a rotationally fixed connection between the seventh gear 72c and the second output shaft 69. Accordingly, this arrangement constitutes the seventh gear selector K7. In contrast, when the hub sleeve S5 is pushed axially toward the third gear 71b into engagement with the spline P3, the hub sleeve S5 makes a rotationally fixed connection between the third gear 71b and the second output shaft 69. Accordingly, this arrangement constitutes the third gear selector K3.

The output shaft gear pair 78 is arranged on the first output shaft 67 and the second output shaft 69, and also on the final reduction gear output shaft 77 that is arranged in parallel relationship to these two shafts (the first output shaft 67 and the second output shaft 69). This output shaft gear pair 78 includes a first output shaft output gear 78a installed on the first output shaft 67 for rotation as one body, a second output shaft output gear 78b installed on the second output shaft 69 for rotation as one body, and a final reduction gear output shaft gear 78c arranged for the final reduction gear output shaft 77.

The transmission 61 of the fourth embodiment that has such a constitution can set seven forward driving speed ratios and one reverse driving speed ratio. In such a constitution, in the first forward gear, the power transmission path runs via the first clutch C1 to the first input shaft 64 to the first/reverse gear pair 70 to the first countershaft 66 to the first gear pair 73 to the second countershaft 68 to the first/second/reverse gear pair 74 to the first output shaft 67 to the output shaft gear pair 78 to final reduction gear output shaft 77. Thus, the number of tooth engagements or engaged gear pairs for torque transfer is "4", one at the first/reverse gear pair 70, another at the first gear pair 73, another at the first/second/reverse gear pair 74, and another at the output shaft gear pair 78.

In addition, in the second forward gear, the power transmission path runs via the second clutch C2 to the second input shaft 65 to the first/second/reverse gear pair 74 to the first output shaft 67 to the output shaft gear pair 78 to the final reduction gear output shaft 77. Thus, the number of tooth engagements or engaged gear pairs for torque transfer is "2", one at the first/second/reverse gear pair 74 and the other at the output shaft gear pair 78.

In addition, in the third forward gear, the power transmission path runs via the first clutch C1 to the first input shaft to the to third gear pair 71 to the second output shaft 69 to the output shaft gear pair 78 to the final reduction gear output shaft 77. Thus, the number of tooth engagements or engaged gear pairs for torque transfer is "2", one at the third gear pair 71 and the other at the output shaft gear pair 78.

In addition, in the fourth forward gear, the power transmission path runs via the second clutch C2 to the second input shaft 65 to the fourth gear pair 76 to the second output shaft 69 to the output shaft gear pair 78 to the final reduction gear output shaft 77. Thus, the number of tooth engagements or engaged gear pairs for torque transfer is "2", one at the fourth gear pair 76 and the other at the output shaft gear pair 78.

In addition, in the fifth forward gear, the power transmission path runs via the first clutch C1 to the first input shaft 64 to the fifth/seventh gear pair 72 to the first output shaft 67 to the output shaft gear pair 78 to the final reduction gear output shaft 77. Thus, the number of tooth engagements or engaged gear pairs for torque transfer is "2", one at the fifth/seventh gear pair 72 and the other at the output shaft gear pair 78.

In addition, in the sixth forward gear, the power transmission path runs via the second clutch C2 to the second input shaft 65 to the sixth gear pair 75 to the first output shaft 67 to the output shaft gear pair 78 to the final reduction gear output shaft 77. Thus, the number of tooth engagements or engaged gear pairs for torque transfer is "2", one at the sixth gear pair 75 and the other at the output shaft gear pair 78.

In addition, in the seventh forward gear, the power transmission path runs via the first clutch C1 to the first input shaft 64 to the fifth/seventh gear pair 72 to the second output shaft 69 to the output shaft gear pair 78 to the final reduction gear output shaft 77. Thus, the number of tooth engagements or engaged gear pairs for torque transfer is "2", one at the fifth/seventh gear pair 72 and the other at the output shaft gear pair 78.

In addition, in the reverse gear, the power transmission path runs via the first clutch C1 to the first input shaft 64 to the first/reverse gear pair 70 to the first countershaft 66 to the first/second/reverse gear pair 74 to the first output shaft 67 to the output shaft gear pair 78 to the final reduction gear output shaft 77. Thus, the number of tooth engagements or engaged gear pairs for torque transfer is "3", one at the first/reverse gear pair 70, another at the first/second/reverse gear pair 74, and the other at the output shaft gear pair 78.

As above, the number of tooth engagements or engaged gear pairs of the transmission 61 according to the fourth embodiment is "4" for the first gear, "2" for each of the second to seventh gears, and "3" for the reverse gear. On this account, similarly to the first embodiment, it is possible, with the transmission 61, to aim at miniaturization of a transmission, improvement of transmission efficiency, and restraint of noise.

In addition, in this fourth embodiment, the gears on the transmission shaft 63 are the first/second gear 74a, the fourth gear 76a, the first gear 73a, the sixth gear 75a, the fifth/seventh gear 72a, the first/reverse gear 70a, and the third gear 71a, and thus, they amount to seven in number and line up without a gap.

As a result, it is now possible to use a shortened shaft as the transmission shaft 63 because the number of gears arranged on the transmission shaft 63 is less by one than eight in the first embodiment. If a transmission is long in axial direction, it is common that there is big design restraint, difficulty in installing the transmission, when applying it to a FF vehicle of the type having a transversely mounted engine because a width of the vehicle is limited. At this point, the fourth embodiment is advantageous over the first embodiment.

Fifth Embodiment

Figure 16:
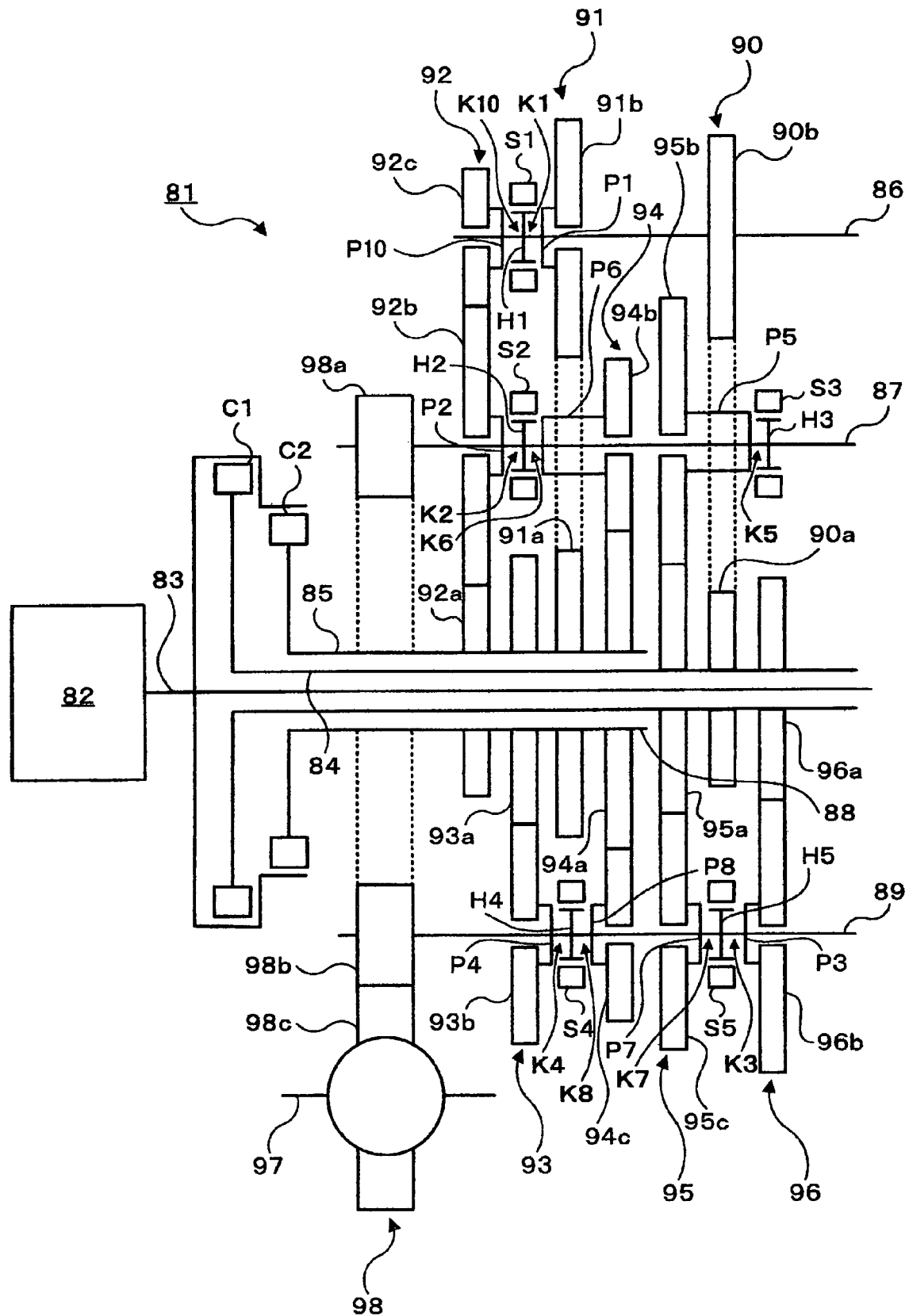
FIG. 16 is a simplified schematic view of a vehicle transmission in accordance with a fifth embodiment of the present invention.

Referring now to FIG. 16, a simplified schematic view of a vehicle transmission 81 is illustrated in accordance with a fifth embodiment. In view of the similarity between the fifth embodiment and the prior embodiments, selected parts of the fifth embodiment that are identical to the parts of the prior embodiments will be given the same reference numerals as the parts of the prior embodiments.

The vehicle transmission 81 is operatively coupled to an engine 82 that is a main power source by a main transmission shaft 83, a first input shaft 84 and a second input shaft 85. The first and second input shafts 84 and 85 are coaxial input shafts that are in coaxial relationship with the transmission shaft 83. Torque is selectively transmitted from the transmission shaft 83 to the first and second input shafts 84 and 85 by the first and second clutches C1 and C2, respectively. In particular, the first clutch C1 is disposed between the transmission shaft 83 and the first input shaft 84, while the second clutch C2 is disposed between the transmission shaft 83 and the second input shaft 85. Thus, the first clutch C1 provides or interrupts a torque transmission between the transmission shaft 83 and the first input shaft 84, while the second clutch C2 provides or interrupts a torque transmission between the transmission shaft 83 and the second input shaft 85. Preferably, each of the first and second clutches C1 and C2 is a frictional clutch, for example that is selectively controlled by a controller (not illustrated). The first and second clutches C1 and C2 can be shifted to any one of a fully closed state (i.e., engagement state) that provides a torque transmission, an open state (i.e., disengagement state) that does not provide a torque transmission and a slip state that is an intermediate state between them.

Furthermore, the transmission 81 further includes a first countershaft 86, a first output shaft 87, a second countershaft 88 and a second output shaft 89. These four shafts 86 to 89 are arranged in parallel relationship with the transmission shaft 83, the first input shaft 84 and the second input shaft 85. In addition, the second countershaft 88 and the second input shaft 85 are coupled together for rotation. These four shafts 86 to 89 are provided with a plurality of gear pairs for shifting between the various driving speed ratios. In particular, the transmission 81 further includes a first/reverse gear pair 90, a first gear pair 91, a first/second/reverse pair 92, a fourth gear pair 93, a sixth/eighth gear pair 94, a fifth/seventh gear pair 95 and a third gear pair 96. A final reduction gear output shaft 97 is arranged in parallel relationship to the first and second output shafts 87 and 89 with an output shaft gear pair 98 arranged between the final reduction gear output shaft 58 and the first and second output shafts 87 and 89.

The first/reverse gear pair 90 is disposed between the first input shaft 84 and the first countershaft 86. This first/reverse gear pair 90 includes a first/reverse gear 90a installed on the first input shaft 84 for rotation as one body and a first/reverse gear 90b installed on the first countershaft 86 for rotation as one body. The first/reverse gears 90a and 90b mesh with each other in the first forward gear or first reverse gear to transmit torque from the first input shaft 84 to the first countershaft 86.

The first gear pair 91 is disposed between the second countershaft 88 and the first countershaft 86. This first gear pair 91 includes a first gear 91a installed on the second countershaft 88 for rotation as one body and a first gear 91b arranged coaxially with the first countershaft 86 for free rotation for torque rotation in the first forward gear.

The first/second/reverse gear pair 92 is disposed between the second countershaft 88, the first output shaft 87, and the first countershaft 86. This first/second/reverse gear pair 92 includes a first/second gear 92a installed on the second countershaft 88 for rotation as one body, a first/second/reverse gear 92b arranged coaxially with the first output shaft 87 for free rotation, and a reverse gear 92c arranged coaxially with the first countershaft 86 for free rotation. In the first and second gears, there is torque transmission between the first/second gear 92a and the first/second/reverse gear 92b. In the reverse gear, there is torque transmission between the first/second/reverse gear 92b and the reverse gear 92c.

The fourth gear pair 93 is disposed between the second countershaft 88 and the second output shaft 89. This fourth gear pair 93 includes a fourth gear 93a installed on the second countershaft 88 for rotation as one body and a fourth gear 93b arranged coaxially with the second output shaft 89 for free rotation for torque transmission in the fourth forward gear.

The sixth/eighth gear pair 94 is disposed among the first input shaft 84, the first output shaft 87, and the second output shaft 89. This sixth/eighth gear pair 94 includes a sixth/eighth gear 94a installed on the first input shaft 84 for rotation as one body, a sixth gear 94b arranged coaxially with the first output shaft 87 for free rotation, and an eighth gear 94c arranged coaxially with the second output shaft 89 for free rotation. In the sixth forward gears, there is torque transmission between the sixth/eighth gear 94a and the sixth gear 94b. In the eighth gear, there is torque transmission between the sixth/eighth gear 94a and the eighth gear 94c.

The fifth/seventh gear pair 95 is disposed among the first input shaft 84, the first output shaft 87, and the second output shaft 89. This fifth/seventh gear pair 95 includes a fifth/seventh gear 95a installed on the first input shaft 84 for rotation as one body, a fifth gear 95b coaxially arranged on the first output shaft 87 for free rotation, and a seventh gear 95c coaxially arranged on the second output shaft 89 for free rotation. In the fifth gear, there is torque transmission between the fifth/seventh gear 95a and the fifth gear 95b. In the seventh gear, there is a torque transmission between the fifth/seventh gear 95a and the seventh gear 95c.

Furthermore, the third gear pair 96 is disposed between the first input shaft 84 and the second output shaft 89. This third gear pair 96 includes a third gear 96a installed on the first input shaft 84 for rotation as one body, and a third gear 96b coaxially arranged on the second output shaft 89 for free rotation for torque transmission in the third forward gear.

The two freely rotatable gears (the reverse gear 92c and the first gear 91b) are arranged on the first countershaft 86 from the left of the drawing sequentially for free rotation, and two intermeshing clutch mechanisms or selectors (K10, K1) are arranged to selectively connect these gears to the first countershaft 86.

In particular, the hub sleeve S1 is arranged between the reverse gear 92c and the first gear 91b in spline-connection with the clutch hub H1 that is fixedly connected to the first countershaft 86 as one body. The hub sleeve S1 can be pushed axially toward the reverse gear 92c into engagement with the spline P10, so that the hub sleeve S1 makes a rotationally fixed connection between the reverse gear 92c and the first countershaft 86. Accordingly, this arrangement constitutes the reverse gear selector K10. In contrast, when the hub sleeve S1 is pushed axially toward the first gear 91b into engagement with the spline P1, the hub sleeve S1 makes a rotationally fixed connection between the first gear 91b and the first countershaft 86. Accordingly, this arrangement constitutes the first gear selector K1.

Three freely rotatable gears (the first/second/reverse gear 92b, the sixth gear 94b, and the fifth gear 95b) are arranged on the first output shaft 87 from the left of the drawing sequentially for free rotation, and three intermeshing clutch mechanisms or selectors (K2, K6, K5) are arranged to selectively connect these gears to the first output shaft 87.

In particular, the hub sleeve S2 is arranged between the first/second/reverse gear 92b and the sixth gear 94b in spline-connection with the clutch hub H2 fixedly connected to the first output shaft 87 as one body. The hub sleeve S2 can be pushed axially toward the first/second/reverse gear 92b into engagement with the spline P2, so that the hub sleeve S2 makes a rotationally fixed connection between the first/second/reverse gear 92b and the first output shaft 87. Accordingly, this arrangement constitutes the second gear selector K2. In contrast, when the hub sleeve is pushed axially toward the sixth gear 94b into engagement with the spline P6, the hub sleeve S2 makes a rotationally fixed connection between the sixth gear 94b and the first output shaft 87. Accordingly, this arrangement constitutes the sixth gear selector K6.

In addition, the hub sleeve S3 is arranged on the right side, viewing in the drawing, of the fifth gear 95b in spline-connection with the clutch hub H3 that is fixedly connected to the first output shaft 87 as one body. The hub sleeve S3 can be pushed axially toward the fifth gear 95b into engagement with the spline P5, so that the hub sleeve S3 makes a rotationally fixed connection between the fifth gear 95b and the first output shaft 87. Accordingly, this arrangement constitutes the fifth gear selector K5.

Four freely rotatable gears (the fourth gear 93b, the eighth gear 94c, the seventh gear 95c and the third gear 96b) are arranged on the second output shaft 89 from the left of the drawing sequentially for free rotation, and four intermeshing clutch mechanisms or selectors (K4, K8, K7, K3) are arranged to selectively connect these gears to the second output shaft 89.

In particular, the hub sleeve S4 is arranged between the fourth gear 93b and the eighth gear 94c in spline-connection with the clutch hub H4 that is fixedly connected to the second output shaft 89 as one body. The hub sleeve S4 can be pushed axially toward the fourth gear 93b into engagement with the spline P4, so that it makes a rotationally fixed connection between the fourth gear 93b and the second output shaft 89. Accordingly, this arrangement constitutes the fourth gear selector K4. In contrast, when the hub sleeve is pushed axially toward the eighth gear 94c into engagement with the spline P8, the hub sleeve S4 makes a rotationally fixed connection between the eighth gear 94c and the second output shaft 89. Accordingly, this arrangement constitutes the eighth gear selector K8.

In addition, the hub sleeve S5 is arranged between the seventh gear 95c and third gear 96b in spline-connection with the clutch hub H5 that is fixedly connected to the second output shaft 89 as one body. The hub sleeve S5 can be pushed axially toward the seventh gear 95c into engagement with the spline P7, so that the hub sleeve S5 makes a rotationally fixed connection between the seventh gear 95c and the second output shaft 89. Accordingly, this arrangement constitutes the seventh gear selector K7. In contrast, when the hub sleeve is pushed axially toward the third gear 96b into engagement with the spline P3, the above-mentioned hub sleeve S5 makes a rotationally fixed connection between the third gear 96b and the second output shaft 89. Accordingly, this arrangement constitutes the third gear selector K3.

The output shaft gear pair 98 is arranged on the first output shaft 87 and the second output shaft 89, and also on the final reduction gear output shaft 97 that is arranged in parallel relationship to these two shafts (the first output shaft 87 and the second output shaft 89). This output shaft gear pair 98 includes a first output shaft output gear 98a installed on the first output shaft 87 for rotation as one body, a second output shaft output gear 98b installed on the second output shaft 89 for rotation as one body, and a final reduction gear output shaft gear 98c arranged for the final reduction gear output shaft 97.

The transmission 81 of the fifth embodiment that has such a constitution can set eight forward driving speed ratios and one reverse driving speed ratio. In such a constitution, in the first forward gear, the power transmission path runs via the first clutch C1 to the first input shaft 84 to the first/reverse gear pair 90 to the first countershaft 86 to the first gear pair 91 to second countershaft 88 to the first/second/reverse gear pair 92 to the first output shaft 87 to the output shaft gear pair 98 to the final reduction gear output shaft 97. Thus, the number of tooth engagements or engaged gear pairs for torque transfer is "4", one at the first/reverse gear pair 90, another at the first gear pair 91, another at the first/second/reverse gear pair 92, and another at the output shaft gear pair 98.

In addition, in the second forward gear, the power transmission path runs via the second clutch C2 to the second input shaft 85 to the first/second/reverse gear pair 92 to the first output shaft 87 to the output shaft gear pair 98 to the final reduction gear output shaft 97. Thus, the number of tooth engagements or engaged gear pairs for torque transfer is "2", one at the first/second/reverse gear pair 92 and the other at the output shaft gear pair 98.

In addition, in the third forward gear, the power transmission path runs via the first clutch C1 to the first input shaft 84 to the third gear pair 96 to the second output shaft 89 to the output shaft gear pair 98 to the final reduction gear output shaft 97. Thus, the number f tooth engagements for torque transfer is "2", one at the third gear pair 96 and the other at the output shaft gear pair 98.

In addition, in the fourth forward gear, the power transmission path runs via the second clutch C2 to the second input shaft 85 to the fourth gear pair 93 to the second output shaft 89 to the output shaft gear pair 98 to the final reduction gear output shaft 97. Thus, the number of tooth engagements or engaged gear pairs for torque transfer is "2", one at the fourth gear pair 93 and the other at the output shaft gear pair 98.

In addition, in the fifth forward gear, the power transmission path runs via the first clutch C1 to the first input shaft 84 to the fifth/seventh gear pair 95 to the second output shaft 89 to the output shaft gear pair 98 to the final reduction gear output shaft 97. Thus, the number of tooth engagements or engaged gear pairs for torque transfer is "2", one at the fifth/seventh gear pair 95 and the other at the output shaft gear pair 98.

In addition, in the sixth forward gear, the power transmission path runs via the second clutch C2 to the second input shaft 85 to the sixth/eighth gear pair 94 to the first output shaft 87 to the output shaft gear pair 98 to the first output shaft 87 to the output shaft gear pair 98 to the final reduction gear output shaft 97. Thus, the number of tooth engagements or engaged gear pairs for torque transfer is "2", one at the sixth/eighth gear pair 94 and the other at the output shaft gear pair 98.

In addition, in the seventh forward gear, the power transmission path runs via the first clutch C1 to the first input shaft 84 to the fifth/seventh gear pair 95 to the second output shaft 89 to the output shaft gear pair 98 to the final reduction gear output shaft 97. Thus, the number of tooth engagements or engaged gear pairs for torque transfer is "2", one at the fifth/seventh gear pair 95 and the other at the output shaft gear pair 98.

In addition, in the eighth forward gear, the power transmission path runs via the second clutch C2 to the second input shaft 85 to the sixth/eighth gear pair 94 to the second output shaft 89 to the output shaft gear pair 98 to the final reduction gear output shaft 97, and the number of tooth engagements or engaged gear pairs for torque transfer is "2", one at the sixth/eighth gear pair 94 and the other at the output shaft gear pair 98.

In addition, in the reverse gear, the power transmission path runs via the first clutch C1 to the first input shaft 84 to the first/reverse gear pair 90 to the first countershaft 86 to the first/second/reverse gear pair 92 to first output shaft 87 to the output shaft gear pair 98 to the final reduction gear output shaft 97. Thus, the number of tooth engagements or engaged gear pairs for torque transfer is "3", one at the first/reverse gear pair 90, another at the first/second/reverse gear pair 92, and the other at the output shaft gear pair 98.

As above, the number of tooth engagements or engaged gear pairs of the transmission 81 according to the fifth embodiment is "4" for the first gear, "2" for each of the second to seventh gears, and "3" for the reverse gear. On this account, similarly to the first embodiment, it is possible, with the transmission 81, to aim at miniaturization of a transmission, improvement of transmission efficiency, and restraint of noise.

In addition, in this fifth embodiment, the gears on the transmission shaft 83 are the first/second gear 92a, the fourth gear 93a, the first gear 91a, the sixth/eighth gear 94a, the fifth/seventh gear 95a, the first/reverse gear 90a, and the third gear 96a, and thus, they amount to seven in number and line up without a gap.

If a transmission is long in axial direction, it is common that there is big design restraint, difficulty in installing the transmission, when applying it to a FF vehicle of the type having a transversely mounted engine because a width of the vehicle is limited. At this point, the fourth embodiment is advantageous over the first embodiment. Comparing with the fourth embodiment, the fifth embodiment is the same as the fourth embodiment in the effect derived from the seven gears, but the former provide an eight-forward-speed transmission.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle transmission comprising:
   a first input shaft having a plurality of first input gears;
   a second input shaft coaxially arranged with respect to the first input shaft and having a plurality of second input gears;
   a first clutch arranged to operatively transmit a driving torque of a power source to the first input shaft;
   a second clutch arranged to operatively transmit the driving torque of the power source to the second input shaft;
   a first output shaft having a plurality of first output gears engaged with selected ones of the first and second input gears to define a plurality of gear pairs that each selectively receives the driving torque from one of the first and second input shafts;
   a second output shaft having a plurality of second output gears engaged with selected ones of the first and second input gears to define a plurality of gear pairs that each selectively receives the driving torque from one of the first and second input shafts;
   a countershaft having a plurality of third output gears with the countershaft being disposed in parallel with the first and second output shafts such that the third output gears are engaged with selected ones of the first and second input gears to define a plurality of gear pairs that each selectively receives the driving torque from one of the first and second input shafts; and
   a plurality of gear selectors operatively disposed to selectively connect and disconnect the first output shaft to selected ones of the first output gears, the second output shaft to selected ones of the second output gears, and the countershaft to selected ones of the third output gears in order to selectively establish a plurality of forward driving speed ratios and at least one reverse driving speed ratio by selectively controlling the gear selectors and the first and second clutches,
   the first input gears, the second input gears, the first output gears, the second output gears and the third output gears being selectively connected such that no more than two sets of the gear pairs are used in establishing a torque transmitting path from one of the first and second input shafts to a final reduction gear output shaft when a forward gear is selected among the forward driving speed ratios other than a first forward gear.

2. The vehicle transmission as set forth in claim 1, wherein the first input gears, the second input gears, the first output gears, the second output gears and the third output gears are arranged to form at least seven of the forward driving speed ratios.

3. The vehicle transmission as set forth in claim 1, wherein the first input gears, the second input gears, the first output gears, the second output gears and the third output gears are arranged such that four sets of the gear pairs are used in establishing a torque transmitting path from one of the first and second input shafts to the final reduction gear output shaft when the first forward gear is selected among the forward driving speed ratios.

4. The vehicle transmission as set forth in claim 1, wherein the first input gears, the second input gears, the first output gears, the second output gears and the third output gears are arranged such that three sets of the gear pairs are used in establishing a torque transmitting path from one of the first and second input shafts to the final reduction gear output shaft when a reverse gear is selected.

5. The vehicle transmission as set forth in claim 1, wherein the gear pairs of the first input gears, the second input gears, the first output gears, the second output gears and the third output gears are arranged to form
   a first/reverse gear pair that is configured to transmit torque between the first input shaft and the countershaft in the first forward gear and a reverse gear;
   a third gear pair that is configured to transmit torque between the first input shaft and the first output shaft in a third forward gear;
   a fifth gear pair that is configured to transmit torque between the first input shaft and the second output shaft in a fifth forward gear;
   a seventh gear pair that is configured to transmit torque between the first input shaft and the second output shaft in a seventh forward gear;
   a fourth gear pair that is configured to transmit torque between the second input shaft and the second output shaft in a fourth forward gear;
   a sixth/eighth gear pair that is configured to transmit torque between the second input shaft and the first output shaft in a sixth forward gear and between the second input shaft and the second output shaft in an eighth forward gear;
   a first/second/reverse gear pair that is configured to transmit torque between the second input shaft and the first output shaft in the first and second forward gears and between the countershaft and the first output shaft in the reverse gear; and
   a first gear pair that is configured to transmit torque between the countershaft and the first output shaft in the first forward gear.

6. The vehicle transmission as set forth in claim 1, wherein the gear pairs of the first input gears, the second input gears, the first output gears, the second output gears and the third output gears are arranged to form
   a first/reverse gear pair that is configured to transmit torque between the first input shaft and the countershaft in the first forward gear and a reverse gear;
   a third gear pair that is configured to transmit torque between the first input shaft and the first output shaft in a third forward gear;

a fifth gear pair that is configured to transmit torque between the first input shaft and the second output shaft in a fifth forward gear;
a seventh gear pair that is configured to transmit torque between the first input shaft and the second output shaft in a seventh forward gear;
a fourth gear pair that is configured to transmit torque between the second input shaft and the second output shaft in a fourth forward gear;
a sixth gear pair that is configured to transmit torque between the second input shaft and the first output shaft in a sixth forward gear;
a first/second/reverse gear pair that is configured to transmit torque between the second input shaft and the first output shaft in the first forward gear and a second forward gear and between the countershaft and the first output shaft in the reverse gear; and
a first gear pair that transmit torque between the countershaft and the second input shaft.

7. The vehicle transmission as set forth in claim 1, wherein the gear pairs of the first input gears, the second input gears, the first output gears, the second output gears and the third output gears are arranged to form
a first/reverse gear pair that is configured to transmit torque between the first input shaft and the countershaft in the first forward gear and a reverse gear;
a third gear pair that is configured to transmit torque between the first input shaft and the first output shaft in a third forward gear;
a fifth gear pair that is configured to transmit torque between the first input shaft and the second output shaft in a fifth forward gear;
a seventh gear pair that is configured to transmit torque between the first input shaft and the second output shaft in a seventh forward gear;
a fourth/sixth gear pair that is configured to transmit torque between the second input shaft and the first output shaft in a fourth forward gear and between the second input shaft and the second output shaft in a sixth forward gear;
a first/second/reverse gear pair that is configured to transmit torque between the second input shaft and the first output shaft in the first forward gear and a second forward gear and between the countershaft and the first output shaft in the reverse gear; and
a first gear pair that is configured to transmit torque between the second input shaft and the countershaft in the first forward gear.

8. The vehicle transmission as set forth in claim 1, wherein the gear pairs of the first input gears, the second input gears, the first output gears, the second output gears and the third output gears are arranged to form
a first/reverse gear pair that is configured to transmit torque between the first input shaft and the countershaft in the first forward gear and a reverse gear;
a third gear pair that is configured to transmit torque between the first input shaft and the first output shaft in a third forward gear;
a fifth/seventh gear pair that is configured to transmit torque between the first input shaft and the first output shaft in a fifth forward gear and between the first input shaft and the second output shaft in a seventh forward gear;
a first gear pair that is configured to transmit torque between the second input shaft and the countershaft in the first forward gear;
a first/second/reverse gear pair that is configured to transmit torque between the second input shaft and the first output shaft in the first forward gear and a second forward gear and between the countershaft and the first output shaft in the reverse gear;
a sixth gear pair that is configured to transmit torque between the second input shaft and the first output shaft in a sixth forward gear; and
a fourth gear pair that is configured to transmit torque between the second input shaft and the second output shaft in a fourth forward gear.

9. The vehicle transmission as set forth in claim 1, wherein the gear pairs of the first input gears, the second input gears, the first output gears, the second output gears and the third output gears are arranged to form
a first/reverse gear pair that is configured to transmit torque between the first input shaft and the countershaft in the first forward gear and a reverse gear;
a first gear pair that transmit torque between the second input shaft and the countershaft in the first forward gear;
a first/second/reverse gear pair that is configured to transmit torque between the second input shaft and the first output shaft in the first forward gear and a second forward gear and between the countershaft and the first output shaft in the reverse gear;
a fourth gear pair that is configured to transmit torque between the second input shaft and the second output shaft in a fourth forward gear;
a sixth/eighth gear pair that is configured to transmit torque between the second input shaft and the first output shaft in a sixth forward gear and between the second input shaft and the second output shaft in an eighth forward gear;
a fifth/seventh gear pair that is configured to transmit torque between the first input shaft and the second output shaft in a fifth forward gear and between the first input shaft and the second output shaft in a seventh forward gear; and
a third gear pair that is configured to transmit torque between the first input shaft and the second output shaft in a third forward gear.

10. A vehicle transmission comprising:
a first input shaft having a plurality of first input gears;
a second input shaft coaxially arranged with respect to the first input shaft and having a plurality of second input gears;
a first clutch arranged to operatively transmit a driving torque of a power source to the first input shaft;
a second clutch arranged to operatively transmit the driving torque of the power source to the second input shaft;
a first output shaft having a plurality of first output gears engaged with selected ones of the first and second input gears to define a plurality of gear pairs that each selectively receives the driving torque from one of the first and second input shafts;
a second output shaft having a plurality of second output gears engaged with selected ones of the first and second input gears to define a plurality of gear pairs that each selectively receives the driving torque from one of the first and second input shafts;
a countershaft having a plurality of third output gears with the countershaft being disposed in parallel with the first and second output shafts such that the third output gears are engaged with selected ones of the first and second input gears to define a plurality of gear pairs that each selectively receives the driving torque from one of the first and second input shafts; and a plurality of gear selectors operatively disposed to selectively connect and disconnect the first output shaft to selected ones of the first output gears, the second output shaft to selected ones of the second output gears, and the countershaft to selected ones of the third output gears in order to selectively establish a plurality of forward driving speed ratios and at least one reverse driving speed ratio by selectively controlling the gear selectors and the first and second clutches, the first input gears, the second input gears, the first output gears, the second output gears and the third output gears being selectively connected such that only two sets of the gear pairs are used in establishing a torque transmitting path from one of the first and second input shafts to a final reduction gear output shaft when at least one of a forward gear is selected among the forward driving speed ratios that is other than a first forward gear, only four sets of the gear pairs are used in establishing a torque transmitting path from one of the first and second input shafts to the final reduction gear output shaft when the first forward gear is selected among the forward driving speed ratios, and only three sets of the gear pairs are used in establishing a torque transmitting path from one of the first and second input shafts to the final reduction gear output shaft when a reverse gear is selected.

11. A driving force transmission apparatus comprising:

first input means for establishing a plurality of first input gears;

second input means for establishing a plurality of second input gears;

first clutch means for operatively connecting and disconnecting a driving torque of a power source to the first input means;

second clutch means for operatively connecting and disconnecting the driving torque of the power source to the second input means;

first output means for establishing a plurality of first output gears engaged with selected ones of the first and second input gears to define a plurality of gear pairs that each selectively receives the driving torque from one of the first and second input means;

second output means for establishing a plurality of second output gears engaged with selected ones of the first and second input gears to define a plurality of gear pairs that each selectively receives the driving torque from one of the first and second input means;

third output means for establishing a plurality of third output gears engaged with selected ones of the first and second input gears to define a plurality of gear pairs that each selectively receives the driving torque from one of the first and second input means; and gear engagement means for selectively connecting and disconnecting the first output means to selected ones of the first output gears, the second output means to selected ones of the second output gears, and the third output means to selected ones of the third output gears in order to selectively establish a plurality of forward driving speed ratios and at least one reverse driving speed ratio by selectively controlling the gear engagement means and the first and second clutch means, the first input gears, the second input gears, the first output gears, the second output gears and the third output gears being selectively connected such that no more than two sets of the gear pairs are used in establishing a torque transmitting path from one of the first and second input means to a final reduction gear output shaft when other than a first forward gear is selected among the forward driving speed ratios.

* * * * *